US012609871B2

(12) United States Patent
Hsieh et al.

(10) Patent No.: US 12,609,871 B2
(45) Date of Patent: Apr. 21, 2026

(54) DETECTING NETWORK ANOMALIES USING NETWORK FLOW DATA

(71) Applicant: Microsoft Technology Licensing, LLC, Redmond, WA (US)

(72) Inventors: Tsuwang Hsieh, Sammamish, WA (US); Santiago Martin Segarra, Houston, TX (US); Sathiya Kumaran Mani, Kirkland, WA (US); Srikanth Kandula, Redmond, WA (US); Michael Dean Wong, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/367,775

(22) Filed: Sep. 13, 2023

(65) Prior Publication Data

US 2025/0088428 A1 Mar. 13, 2025

(51) Int. Cl.
| | |
|---|---|
| *H04L 41/16* | (2022.01) |
| *H04L 41/14* | (2022.01) |
| *H04L 41/147* | (2022.01) |
| *H04L 43/045* | (2022.01) |

(52) U.S. Cl.
CPC ........... *H04L 41/16* (2013.01); *H04L 41/145* (2013.01); *H04L 41/147* (2013.01); *H04L 43/045* (2013.01)

(58) Field of Classification Search
CPC ..... H04L 41/16; H04L 41/145; H04L 41/147; H04L 43/045
See application file for complete search history.

(56) References Cited

U.S. PATENT DOCUMENTS

| | | | | |
|---|---|---|---|---|
| 7,843,843 | B1 * | 11/2010 | Papp, III | H04L 41/5009 |
| | | | | 370/395.42 |
| 11,316,746 | B1 * | 4/2022 | Bitterfeld | H04L 41/16 |
| 11,620,128 | B1 * | 4/2023 | Chawda | G06N 20/00 |
| | | | | 717/120 |
| 2021/0334194 | A1 * | 10/2021 | Xiao | G06N 20/00 |
| 2022/0188850 | A1 * | 6/2022 | Costabello | G06N 3/08 |
| 2022/0343329 | A1 * | 10/2022 | Wang | G06N 20/00 |
| 2023/0118864 | A1 * | 4/2023 | Zhang | G06V 10/26 |
| | | | | 382/103 |

(Continued)

FOREIGN PATENT DOCUMENTS

| | | | | |
|---|---|---|---|---|
| WO | WO-2022167840 A1 * | 8/2022 | | G06N 3/044 |

OTHER PUBLICATIONS

"Aviatrix Cloud Firewall™", Aviatrix, Retrieved from URL: https://aviatrix.com/distributed-cloud-firewall/, Retrieved on Jul. 16, 2025, 11 pages.

(Continued)

*Primary Examiner* — Patrice L Winder
(74) *Attorney, Agent, or Firm* — Rainier Patents, P.S.

(57) ABSTRACT

This document relates to automating detecting anomalies in network behavior of an application Generally, the disclosed techniques can obtain network flow data for an application. A machine learning model can be used to process the network flow data to detect anomalies. The machine learning model can be retrained over time to adapt to changing network behavior of the application. In some cases, a graph neural network is employed to detect the anomalies.

19 Claims, 14 Drawing Sheets

(56) References Cited

U.S. PATENT DOCUMENTS

2024/0250886 A1* 7/2024 Eng .......................... H04L 41/16

OTHER PUBLICATIONS

Burns, et al., "Borg, Omega, and Kubernetes" Communications of the ACM, vol. 59, No. 5, May 2016, pp. 50-57.
Campbell, et al., "Intrusion detection at 100G", State of the Practice Reports, Article No. 14, Nov. 12, 2011, pp. 1-9.
Campbell, et al., "Prototyping a 100G monitoring system", 20th Euromicro International Conference on Parallel, Distributed and Network-based Processing, Feb. 12, 2012, 5 pages.
"Configure flow logs", Tigera, Retrieved from URL: https://docs.tigera.io/calico-cloud/visibility/elastic/flow/, Retrieved on Jul. 16, 2025, 2 pages.
"Discover the innovative world of Napatech Software, SmartNICs and IPUs used in cloud, enterprise and telecom datacenter networks", Napa:tech, Retrieved from URL: https://www.napatech.com/products/, Retrieved on Jul. 28, 2025, 12 pages.
"Endace DAG Data Capture Cards", Retrieved from URL: http://www.emulex.com/products/network—visibility—products—and—services/endacedag-data—capture-cards/features/, Retrieved on Feb. 23, 2015, 2 pages.
Hossain, Munawar, "Trends in Data Center Security: Part 1—Traffic Trends", Cisco, Retrieved from URL: https://blogs.cisco.com/security/trends-in-data-center-security-part-1-traffic-trends, May 21, 2014, 8 pages.
Hsieh, et al., "NetVigil: Robust and Low-Cost Anomaly Detection for East-West Data Center Security", Proceedings of the 21st USENIX Symposium on Networked Systems Design and Implementation, Apr. 16-18, 2024, pp. 1771-1789.
"Introduction to Cilium & Hubble", Cilium, Retrieved from URL: https://docs.cilium.io/en/stable/overview/intro/, Retrieved on Jul. 16, 2025, 6 pages.
Leland, et al., "On the Self—Similar Nature of Ethernet Traffic", Conference proceedings on Communications architectures, protocols and applications, Oct. 1, 1993, pp. 183-193.
Mchenry, Chris, "A Deeper Look at the Distributed Cloud Firewall: A Firewall for the Cloud Era", Retrieved from URL: https://aviatrix.com/blog/a-deeper-look-at-the-distributed-cloud-firewall-a-firewall-for-the-cloud-era/, Aviatrix, May 24, 2023, 15 pages.
"Myricom Sniffer 10G: Sniffer10G Documentation and FAQ", Retrieved from URL: https://www.myricom.com/software/sniffer10g.html□, Retrieved on Dec. 8, 2015, 3 pages.
"Observe. Protect. Adapt.", Suricata, Retrieved from URL: https://suricata.io/, Retrieved on Jul. 16, 2025, 6 pages.
Paxson, Vern, "Bro: a system for detecting network intruders in real-time", Computer networks, vol. 31, Issue 23-24, Dec. 14, 1999, pp. 2435-2463.
"PF_RING™—Open Source packet capture framework", NTOP, Retrieved from URL: https://www.ntop.org/products/packet-capture/pf_ring/, Retrieved on Jul. 28, 2025, 6 pages.
Roesch, Martin, "Short—lightweight intrusion detection for networks", In Proceedings of Lisa, vol. 99, No. 1, Nov. 7-12, 1999, pp. 229-238.
Roy, et al., "Inside the social network's (datacenter) network", Proceedings of the ACM Conference on Special Interest Group on Data Communication, Aug. 17, 2015, pp. 123-137.
"Scaling Suricata Performance to 100 Gbps With Napatech SmartNICs", Napa: Tech, Retrieved from URL: https://www.napatech.com/support/resources/solution-descriptions/scaling-suricata-performance-to-100-gbps-with-napatech-smartnics/, Retrieved on Jul. 16, 2025, 12 pages.
Schneider, et al., "Packet Capture in 10-Gigabit Ethernet Environments Using Contemporary Commodity Hardware", International Conference on Passive and Active Network Measurement, 2007, pp. 207-217.
"Specs Needed for 10GBps", Zeek, Retrieved from URL: http://mailman.icsi.berkeley.edu/pipermail/zeek/2019-September/014574.html, Sep. 18, 2019, 1 page.

Stoffer, et al., "100G Intrusion Detection", Berkeley Lab, Aug. 2015, 32 pages.
Vallentin, et al., "The NIDS Cluster: Scalable, Stateful Network Intrusion Detection on Commodity Hardware", International Workshop on Recent Advances in Intrusion Detection, 2007, pp. 107-126.
"VMware NSX", VirtualizationWorks, Retrieved from URL: https://www.virtualizationworks.com/NSX.asp, Retrieved on Jul. 16, 2025, 2 pages.
"VMware NSX", VMware by Broadcom, Retrieved from URL: https://www.vmware.com/products/cloud-infrastructure/nsx.html, Retrieved on Jul. 16, 2025, 8 pages.
Weaver, et al., "The Shunt: An FPGA-Based Accelerator for Network Intrusion Prevention", Proceedings of the ACM/SIGDA 15th international symposium on Field programmable gate arrays, Feb. 18, 2007, pp. 109-206.
"2017 Equifax data breach", Retrieved from: https://en.wikipedia.org/wiki/2017_Equifax_data_breach, Jul. 28, 2023, 10 Pages.
"2020 United States federal government data breach", Retrieved from: https://en.wikipedia.org/wiki/2020_United_States_federal_government_data_breach, May 17, 2023, 42 Pages.
"Cloud Network Security", Retrieved from: https://www.paloaltonetworks.com/prisma/cloud/cloud-network-security, Retrieved Date: May 6, 2023, 17 Pages.
"Data protection", Retrieved from: https://commission.europa.eu/law/law-topic/data-protection_en, Retrieved Date: May 6, 2023, 3 Pages.
"Deep Graph Library", Retrieved from: https://www.dgl.ai/, Retrieved Date: May 6, 2023, 4 Pages.
"Logging IP traffic using VPC Flow Logs", Retrieved from: https://docs.aws.amazon.com/vpc/latest/userguide/flow-logs.html, Retrieved Date: May 6, 2023, 14 Pages.
"Microsoft Digital Defense Report", Retrieved from: https://www.microsoft.com/en-us/security/business/microsoft-digital-defense-report-2022, Retrieved Date: May 6, 2023, 4 Pages.
"NetworkX", Retrieved from:https://networkx.org/, Apr. 2023, 1 Page.
"Pandas", Retrieved from: https://pandas.pydata.org/, Retrieved Date: May 6, 2023, 4 Pages.
"PyTorch", Retrieved from: https://pytorch.org/, Retrieved Date: May 6, 2023, 4 Pages.
"Simulate, Validate, and Mitigate with the Infection Monkey", Retrieved from: https://www.akamai.com/infectionmonkey, Retrieved Date: May 6, 2023, 12 Pages.
"Zero Trust: the security paradigm for the modern organization", Retrieved from: https://www.illumio.com/solutions/zero-trust, Retrieved Date: May 6, 2023, 7 Pages.
Akoglu, et al., "Graph based Anomaly Detection and Description: A Survey", In Journal of Data Mining and Knowledge Discovery, vol. 29, Issue 3, May 2015, pp. 626-688.
Akoglu, et al., "Oddball: Spotting Anomalies in Weighted Graphs", In Proceedings of 14th Pacific-Asia Conference in Advances in Knowledge Discovery and Data Mining, Jun. 21, 2010, 12 Pages.
Arzani, et al., "PrivateEye: Scalable and Privacy-Preserving Compromise Detection in the Cloud", In Proceedings of the 17th USENIX Symposium on Networked Systems Design and Implementation, Feb. 25, 2020, pp. 797-815.
Bilge, et al., "Before we knew it: An Empirical Study of Zero-day Attacks in the Real World", In Proceedings of ACM Conference on Computer and Communications Security, Oct. 16, 2012, pp. 833-844.
Chakrabarti, Deepayan, "AutoPart: Parameter-Free Graph Partitioning and Outlier Detection", In Proceedings of 8th European Conference on Principles and Practice of Knowledge Discovery in Databases, Sep. 20, 2004, 12 Pages.
Chandola, et al., "Anomaly Detection: A Survey", In Journal ACM Computing Surveys, vol. 41, Issue 3, Jul. 1, 2009, 58 Pages.
Chau, et al., "Detecting Fraudulent Personalities in Networks of Online Auctioneers", In Proceedings of 10th European Conference on Principles and Practice of Knowledge Discovery in Databases, Sep. 18, 2006, pp. 103-114.

(56) References Cited

OTHER PUBLICATIONS

Chowdhury, et al., "Unfolding WMMSE using graph neural networks for efficient power allocation", In Journal of IEEE Transactions on Wireless Communications, vol. 20, Issue 9, Sep. 2021, pp. 6004-6017.

Cortes, et al., "Communities of Interest", In Proceedings of the 4th International Conference in Advances in Intelligent Data Analysis, Sep. 13, 2001, 10 Pages.

Dai, et al., "Detecting Anomalies in Bipartite Graphs with Mutual Dependency Principles", In Proceedings of IEEE 12th International Conference on Data Mining, Dec. 10, 2012, pp. 171-180.

Fedus, et al., "Deep Graph Infomax", In Proceedings of the International Conference on Learning Representations, May 6, 2019, 12 Pages.

Fu, et al., "Realtime Robust Malicious Traffic Detection via Frequency Domain Analysis", In Proceedings of the ACM SIGSAC Conference on Computer and Communications Security, Nov. 15, 2021, pp. 3431-3446.

Noble, et al., "Graph-Based Anomaly Detection", In Proceedings of Ninth ACM SIGKDD International Conference on Knowledge Discovery and Data Mining, Aug. 24, 2003, pp. 631-636.

Gao, et al., "On Community Outliers and their Efficient Detection in Information Networks", In Proceedings of the 16th ACM SIGKDD International Conference on Knowledge Discovery and Data Mining, Jul. 25, 2010, 10 Pages.

Hamilton, et al., "Inductive Representation Learning on Large Graphs", In Proceeding of 31st Conference on Neural Information Processing Systems, Dec. 4, 2017, 11 Pages.

Hassani, et al., "Contrastive Multi-View Representation Learning on Graphs", In International Conference on Machine Learning, Nov. 21, 2020, 11 Pages.

He, et al., "An Overview on the Application of Graph Neural Networks in Wireless Networks", In Journal of IEEE Open Journal of the Communications Society, vol. 2, Nov. 17, 2021, pp. 2547-2565.

Hu, et al., "An embedding approach to anomaly detection", In Proceedings of IEEE 32nd International Conference on Data Engineering, May 16, 2016, pp. 385-396.

Hu, et al., "Strategies for Pre-Training Graph Neural Networks", In Proceedings of 8th International Conference on Learning Representations, Apr. 26, 2020, 22 Pages.

Ide, et al., "Eigenspace-Based Anomaly Detection in Computer Systems", In Proceedings of the Tenth ACM SIGKDD International Conference on Knowledge Discovery and Data Mining, Aug. 22, 2004, pp. 440-449.

Modi, et al., "A Survey of Intrusion Detection Techniques in Cloud", In Journal of Network and Computer Applications, vol. 36, Issue 1, Jan. 2013, 14 Pages.

Jiao, et al., "Sub-graph Contrast for Scalable Self-supervised Graph Representation Learning", In Proceedings of IEEE International Conference on Data Mining, Nov. 17, 2020, pp. 222-231.

Kazwini, et al., "Flow Logging for Network Security Groups", Retrieved from: https://learn.microsoft.com/en-us/azure/network-watcher/network-watcher-nsg-flow-logging-overview, May 24, 2023, 20 Pages.

Khraisat, et al., "Survey of Intrusion Detection Systems: Techniques, Datasets and Challenges", In Journal of Cybersecurity, vol. 2, Jul. 17, 2019, 22 Pages.

Kindervag, John, "Build Security into Your Network's DNA: The Zero Trust Network Architecture", In Forrester Research Inc, vol. 27, Nov. 5, 2010, 27 Pages.

Kipf, et al., "Semi-Supervised Classification with Graph Convolutional Networks", In Proceedings of 5th International Conference on Learning Representations, Apr. 24, 2017, 14 Pages.

Kumar, et al., "Signature Based Intrusion Detection System using SNORT", In International Journal of Computer Applications & Information Technology, vol. 1, Issue III, Nov. 2012, pp. 35-41.

Mirsky, et al., "Kitsune: An Ensemble of Autoencoders for Online Network Intrusion Detection", In Proceedings of 25th Annual Network and Distributed System Security Symposium, Feb. 18, 2018, 15 Pages.

Liao, et al., "Intrusion Detection System: A Comprehensive Review", In Journal of Network and Computer Applications, vol. 36, Jan. 1, 2013, pp. 16-24.

Liu, et al., "Accelerated Local Anomaly Detection via Resolving Attributed Networks", In Proceedings of Proceedings of the Twenty-Sixth International Joint Conference on Artificial Intelligence, Aug. 29, 2017, pp. 2337-2343.

Liu, et al., "Graph Self-supervised Learning: A Survey", In Journal of IEEE Transactions on Knowledge and Data Engineering, vol. 35, Issue 6, Jun. 1, 2023, pp. 5879-5900.

Lo, et al., "E-GraphSAGE: A Graph Neural Network based Intrusion Detection System for IOT", In Proceedings of IEEE/IFIP Network Operations and Management Symposium, Apr. 25, 2022, 9 Pages.

Ma, et al., "A Comprehensive Survey on Graph Anomaly Detection with Deep Learning", In Journal of IEEE Transactions on Knowledge and Data Engineering, Jan. 8, 2021, 32 Pages.

Marcus, Willett, "Lessons of the SolarWinds Hack", In Journal of Survival vol. 63, Issue 2, Mar. 30, 2021, pp. 7-26.

Zhang, et al., "Deep Learning on Graphs: A Survey", In Journal of IEEE Transactions on Knowledge and Data Engineering, vol. 34, Issue 1, Jan. 1, 2022, pp. 249-270.

Zhao, et al., "Achieving 100Gbps Intrusion Prevention on a Single Server", In 14th USENIX Symposium on Operating Systems Design and Implementation, Nov. 4, 2020, pp. 1083-1100.

Zheng, et al., "AddGraph: Anomaly Detection in Dynamic Graph Using Attention-based Temporal GCN", In Proceedings of the Twenty-Eighth International Joint Conference on Artificial Intelligence, vol. 3, Aug. 10, 2019, pp. 4419-4425.

Zheng, et al., "One-Class Adversarial Nets for Fraud Detection", In Proceedings of the Thirty-Third AAAI Conference on Artificial Intelligence, vol. 33, Issue 1, Jul. 17, 2019, pp. 1286-1293.

Zhu, et al., "Packet-Level Telemetry in Large Datacenter Networks", In Proceedings of the ACM Conference on Special Interest Group on Data Communication, Aug. 17, 2015, pp. 479-491.

Pang, et al., "Deep Learning for Anomaly Detection: A Review", In Journal of ACM Computing Surveys, vol. 54, Issue 2, Jan. 2020, 36 Pages.

Peng, et al., "Graph Representation Learning via Graphical Mutual Information Maximization", In Proceedings of the Web Conference, Apr. 20, 2020, 11 Pages.

Qiu, et al., "GCC: Graph Contrastive Coding for Graph Neural Network Pre-Training", In Proceedings of the 26th ACM SIGKDD International Conference on Knowledge Discovery & Data Mining, Aug. 2020, 11 Pages.

Rahman, et al., "Efficient and Scalable Socware Detection in Online Social Networks", In Proceedings of the 21st USENIX Conference on Security Symposium, Jun. 2012, 16 Pages.

Renovate, et al., "GoogleCloudPlatform / microservices-demo", Retrieved from: https://github.com/GoogleCloudPlatform/microservices-demo, Jun. 16, 2023, 7 Pages.

Rose, et al., "Zero Trust Architecture", In Publication of NIST Special Publication, Report No. 800-207 Journal, Aug. 10, 2020, 59 Pages.

Schneide, Fredb., "Least Privilege and More Computer Security", In Journal of IEEE Security & Privacy, vol. 1, Issue 5, Oct. 14, 2003, pp. 55-59.

Sharma, et al., "Different Firewall techniques: A Survey", In Proceedings of fifth International Conference on Computing, Communications and Networking Technologies, Jul. 11, 2014, 6 Pages.

Sikarwar, et al., "Micro Segmentation: Today's Success Formulae", In International Journal of Operations Management and Services, vol. 2, Issue 1, Nov. 2012, 6 Pages.

Sun, et al., "InfoGraph: Unsupervised and Semi-supervised Graph-level Representation Learning via Mutual Information Maximization", In International Conference on Learning Representations, Apr. 26, 2020, 16 Pages.

(56) References Cited

OTHER PUBLICATIONS

Suresh, et al., "Adversarial Graph Augmentation to Improve Graph Contrastive Learning", In Journal of Advances in Neural Information Processing Systems, Dec. 6, 2021, 14 Pages.

Zhu, et al., "Graph Contrastive Learning with Adaptive Augmentation", In Proceedings of the Web Conference, Apr. 2021, 12 Pages.

Teng, et al., "Anomaly Detection in Dynamic Networks using Multi-view Time-series Hypersphere Learning", In Proceedings of the ACM on Conference on Information and Knowledge Management, Nov. 6, 2017, pp. 827-836.

Tian, et al., "Real-time Lateral Movement Detection based on Evidence Reasoning Network for Edge Computing Environment", In Journal of IEEE Transactions on Industrial Informatics, vol. 15, Issue 7, Jul. 2019, pp. 4285-4294.

Vanickis, et al., "Access Control Policy Enforcement for Zero-trust-Networking", In Proceedings of 29th Irish Signals and Systems Conference, Jun. 21, 2018, 6 Pages.

Velickovic, et al., "Graph Attention Networks", In Proceedings of 6th International Conference on Learning Representations, Apr. 30, 2018, 12 Pages.

Wang, et al., "Decoupling Representation Learning and Classification for GNN-based Anomaly Detection", In Proceedings of the 44th International ACM SIGIR Conference on Research and Development in Information Retrieval, Jul. 15, 2021, 10 Pages.

Wang, et al., "Dynamic Graph CNN for Learning on Point Clouds", In Journal of CM Transactions on Graphics, vol. 38, Issue 5, Oct. 2019, 12 Pages.

Wu, et al., "A Comprehensive Survey on Graph Neural Networks", In Journal of IEEE Transactions on Neural Networks and Learning Systems, vol. 32, Issue 1, Jan. 2021, pp. 4-24.

You, et al., "Graph Contrastive Learning Automated", In Proceedings of the 38th International Conference on Machine Learning, Jul. 1, 2021, 12 Pages.

You, et al., "Graph Contrastive Learning with Augmentations", In Proceedings of 34th Conference on Neural Information Processing Systems, Dec. 6, 2020, 12 Pages.

Zhou, et al., "Graph Neural Networks: A Review of Methods and Applications", In Journal of AI open, vol. 1, Jan. 1, 2020, pp. 57-81.

Gamage, et al., "Deep Learning Methods in Network Intrusion Detection: A Survey and an Objective Comparison", In Journal of Network and Computer Applications, vol. 169, Nov. 1, 2020.

Jiang, Weiwei, "Graph-based Deep Learning for Communication Networks: A Survey", In Journal of Computer Communications, vol. 185, Mar. 1, 2022.

Kwon, et al., "A Survey of Deep Learning-based Network Anomaly Detection", In Journal of Cluster Computing, vol. 22, Jan. 2019.

Masdari, et al., "A Survey and Taxonomy of the Fuzzy Signature-based Intrusion Detection Systems", In Journal of Applied Soft Computing, vol. 92, Jul. 2020.

Tankard, Colin, "Advanced Persistent Threats and How to Monitor and Deter Them", In Journal of Network Security, vol. 2011, Issue 8, Aug. 2011, pp. 16-19.

* cited by examiner

INTERNAL NETWORK 100

EXTERNAL NETWORK 104

FACILITY 102

CORE LAYER 118

CORE ROUTERS 106

L3 120

ACCESS ROUTERS 108(1)

ACCESS ROUTERS 108(2)

L2 122

AGGR. SWITCHES 110(1)

AGGR. SWITCHES 110(2)

ToR 112(1)

ToR 112(2)

RACK 114(1)

RACK 114(2)

RACK 114(3)

RACK 114(4)

TENANTS 116(1)

TENANTS 116(2)

| Attack | Description | # flows | Ratio of malicious |
|---|---|---|---|
| Vertical Port Scan | Run an exhaustive scan of open ports | 1429 | 0.0265 |
| SYN Flood | DoS attack where connections are rapidly initialized but not completed | 2437 | 0.0439 |
| SYN Flood DDoS | DoS attack where connections are rapidly initialized but not completed (multiple attackers) | 1473 | 0.0081 |
| UDP DDoS | DoS attack with UDP packets (multiple attackers) | 1473 | 0.0081 |
| Distributed Stealth Port Scan | Run a targeted stealth scan of several key across many nodes with SYN packets | 4069 | 0.0058 |
| Distributed Port Scan | Run a targeted scan of several key ports across many nodes | 4054 | 0.0051 |
| Distributed UDP Port Scan | Run a targeted scan of several key across many nodes with UDP packets | 4319 | 0.0050 |
| Infection Monkey 1 | Scans key ports and launched variety of network exploits | 2768 | 0.0122 |
| Infection Monkey 2 | Scans key ports and launches variety of network exploits (target limited number of hosts) | 1490 | 0.0107 |
| Infection Monkey 3 | Scans key ports and launches variety of network exploits (mount limited number of exploits) | 4677 | 0.0027 |
| Botnet DDoS | Nodes receive commands and file updates from X&C server and launches ping floods | 2163 | 0.0254 |
| DNS amplification | Attackers send DNS requests and direct responses to victim | 4410 | 0.0825 |

| Attack | Kitsune+ | | | Whisper | | | NetVigil | | |
|---|---|---|---|---|---|---|---|---|---|
| | AUC | TPR | FPR | AUC | TPR | FPR | AUC | TPR | FPR |
| Vertical Port Scan | 0.9300 | 0.8684 | 0.0057 | 0.9049 | 0.9736 | 0.1315 | 0.9843 | 0.9473 | 0.0000 |
| SYN Flood | 0.9322 | 0.8653 | 0.0014 | 0.7609 | 0.7307 | 0.1414 | 1.0000 | 1.0000 | 0.0000 |
| SYN Flood DDoS | 0.9455 | 0.8971 | 0.0141 | 0.9148 | 0.9719 | 0.1283 | 1.0000 | 1.0000 | 0.0000 |
| UDP DDoS | 0.9455 | 0.8971 | 0.0141 | 0.6403 | 0.4166 | 0.1457 | 0.998 | 1.0000 | 0.0000 |
| Distributed Stealth Port Scan | 0.4059 | 0.0952 | 0.0300 | 0.3961 | 0.0476 | 0.0329 | 0.9968 | 0.9523 | 0.0000 |
| Distributed Port Scan | 0.7542 | 0.6666 | 0.0758 | 0.6186 | 0.4166 | 0.1070 | 0.9892 | 0.9333 | 0.0000 |
| Distributed UDP Port Scan | 0.3367 | 0.0000 | 0.0281 | 0.3732 | 0.0000 | 0.4449 | 0.9958 | 0.9545 | 0.0183 |
| Infection Monkey 1 | 0.5586 | 0.1176 | 0.0003 | 0.4395 | 0.0588 | 0.0190 | 0.9997 | 1.0000 | 0.0029 |
| Infection Monkey 2 | 0.7497 | 0.5000 | 0.0006 | 0.4396 | - | - | 0.9997 | 1.0000 | 0.0033 |
| Infection Monkey 3 | 0.5000 | - | - | 0.5000 | - | - | 0.9998 | 1.0000 | 0.0006 |
| Botnet DDoS | 0.6347 | 0.4727 | 0.1480 | 0.5000 | - | - | 0.9301 | 0.7636 | 0.0896 |
| DNS amplification | 0.3962 | 0.0000 | 0.0244 | 0.8149 | 0.8928 | 0.2913 | 0.8915 | 0.3736 | 0.0692 |

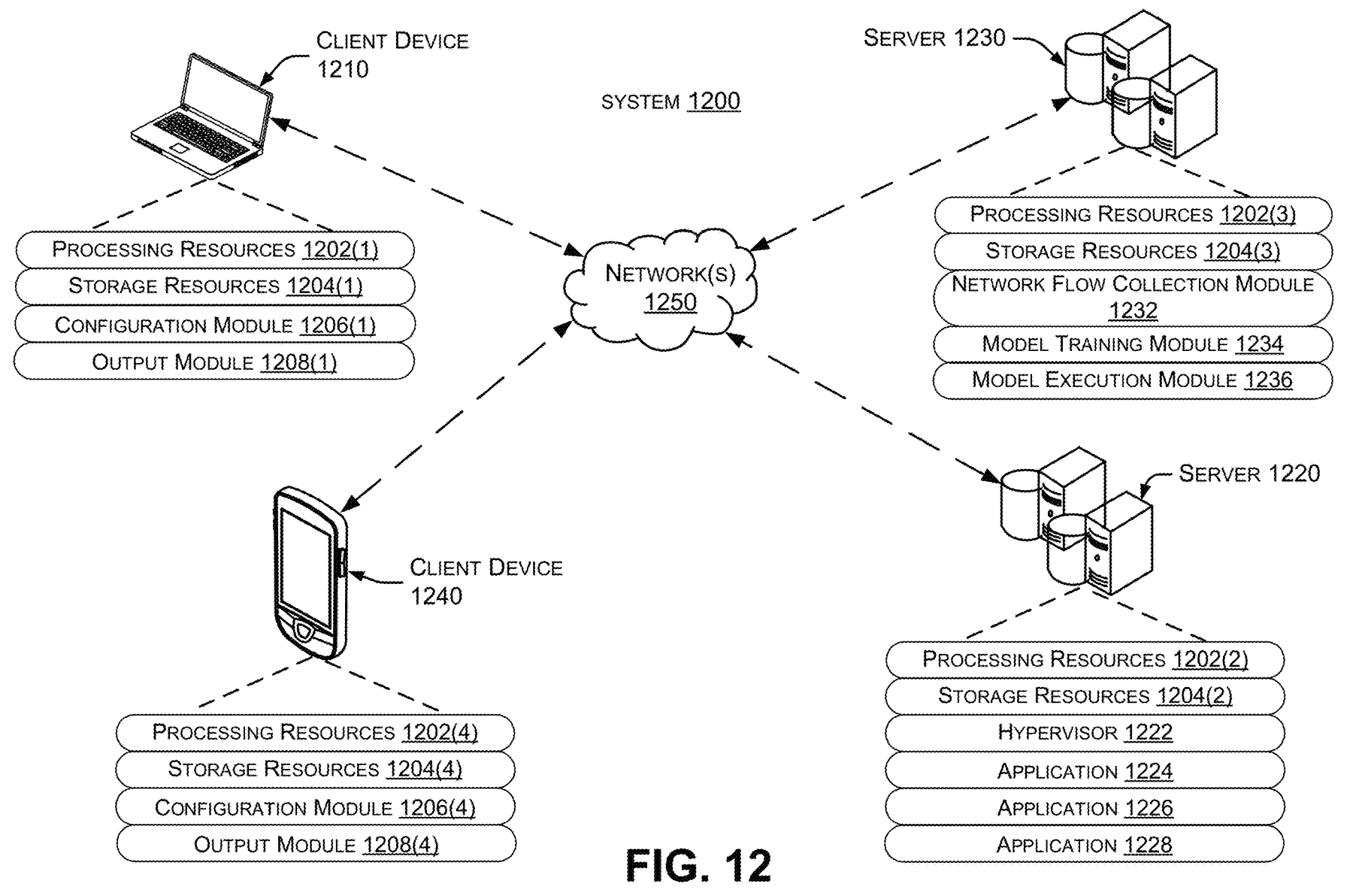

SERVER 1230

PROCESSING RESOURCES 1202(3)
STORAGE RESOURCES 1204(3)
NETWORK FLOW COLLECTION MODULE 1232
MODEL TRAINING MODULE 1234
MODEL EXECUTION MODULE 1236

SERVER 1220

PROCESSING RESOURCES 1202(2)
STORAGE RESOURCES 1204(2)
HYPERVISOR 1222
APPLICATION 1224
APPLICATION 1226
APPLICATION 1228

SYSTEM 1200

NETWORK(S) 1250

CLIENT DEVICE 1210

PROCESSING RESOURCES 1202(1)
STORAGE RESOURCES 1204(1)
CONFIGURATION MODULE 1206(1)
OUTPUT MODULE 1208(1)

CLIENT DEVICE 1240

PROCESSING RESOURCES 1202(4)
STORAGE RESOURCES 1204(4)
CONFIGURATION MODULE 1206(4)
OUTPUT MODULE 1208(4)

FIG. 12

METHOD
<u>1300</u>

1302

OBTAIN NETWORK FLOW DATA

1304

TRAIN MODEL

1306

OUTPUT MODEL

METHOD
<u>1400</u>

1402

OBTAIN NETWORK FLOW DATA

1404

INPUT NETWORK FLOW DATA TO TRAINED MODEL

1406

DETECT ANOMALY

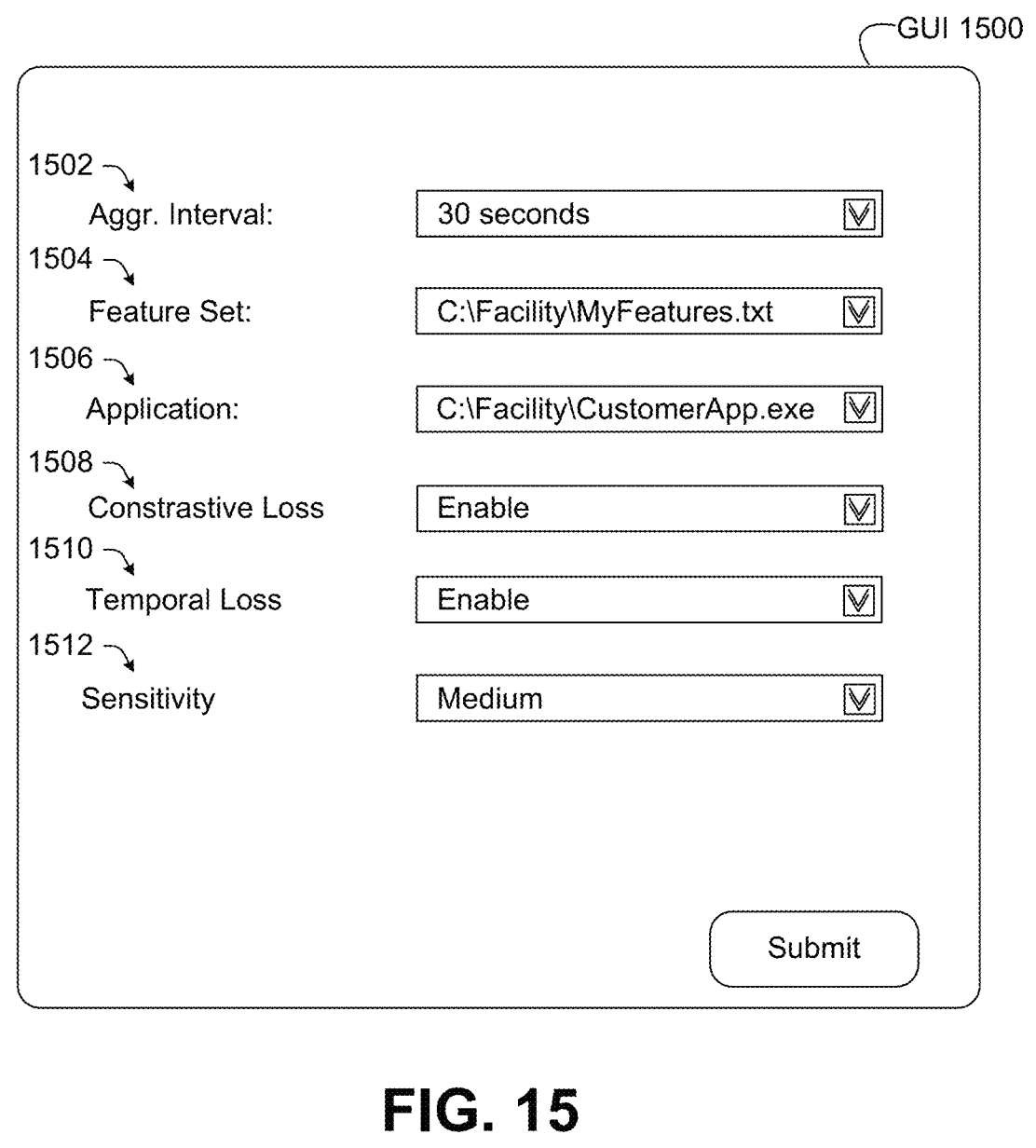

GUI 1500

1502

Aggr. Interval:     | 30 seconds     ▽ |

1504

Feature Set:     | C:\Facility\MyFeatures.txt     ▽ |

1506

Application:     | C:\Facility\CustomerApp.exe     ▽ |

1508

Constrastive Loss     | Enable     ▽ |

1510

Temporal Loss     | Enable     ▽ |

1512

Sensitivity     | Medium     ▽ |

Submit

FIG. 15

DETECTING NETWORK ANOMALIES USING NETWORK FLOW DATA

BACKGROUND

Various approaches exist for detecting network attacks. For instance, one way to protect a network from attacks involves analyzing network communications for an attack signature, but this approach is typically limited to detecting known attacks. Another approach is to analyze individual packet traces of inbound/outbound traffic to detect attacks. However, while this approach can be employed to detect new attacks, analyzing individual packet traces for large-scale networks, such as data center networks, involves analyzing massive quantities of data and is not always feasible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for detecting anomalies. One example includes a method or technique. The method or technique can include obtaining network flow data reflecting aggregate statistics for network communications among a plurality of application instances of an application. The method or technique can also include, based at least on the network flow data, training a machine learning model to represent network behavior of the application. The method or technique can also include outputting the trained machine learning model.

Another example includes a system that entails a hardware processing unit and a storage resource. The storage resource can store computer-readable instructions which, when executed by the hardware processing unit, cause the hardware processing unit to obtain network flow data for an application. The computer readable instructions can also cause the hardware processing unit to input the network flow data to a trained machine learning model. The computer-readable instructions can also cause the hardware processing unit to detect a network anomaly based at least on an output of the trained machine learning model.

Another example includes a computer-readable storage medium storing instructions which, when executed by a processing device, cause the processing device to perform acts. The acts can include obtaining network flow data for an application. The acts can also include inputting the network flow data to a trained machine learning model. The acts can also include detecting a network anomaly based at least on an output of the trained machine learning model.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 5 illustrates an example attack dataset that was employed to evaluate a specific implementation of the present concepts.

FIGS. 6, 7A, 7B, 7C, 8A, 8B, 8C, 9A, 9B, 9C, 10, and 11 convey experimental results obtained using a specific implementation of the present concepts.

FIG. 12 illustrates an example system, consistent with some implementations of the present concepts.

FIGS. 15 and 16 illustrate example graphical user interfaces, consistent with some implementations of the present concepts.

DETAILED DESCRIPTION

Overview

As discussed above, prior approaches for detecting network attacks have certain limitations. Attack signature approaches can be employed to detect known attacks, but generally fail to detect new or "zero-day" attacks. Other approaches can perform analysis of detailed packet traces to detect new attacks. For inbound and outbound or "north-south" data center traffic, this can be a feasible approach. However, for internal or "east-west" traffic within a data center, analyzing detailed packet traces is not feasible given the massive amounts of data present in complete packet traces.

The disclosed implementations overcome these deficiencies of prior approaches by employing aggregate network flow data to detect anomalous behavior. By aggregating network flow data over time intervals, typical application communication behavior within a network can be represented far more compactly than with detailed packet traces. The aggregate network flow data can be analyzed to detect sudden changes in application communication behavior or "anomalies," and then an alert can be raised to a security team to mitigate any potential damage from a network attack.

One way to employ aggregate network flow data to detect network anomalies is to train a machine learning model to represent application communication behavior. Subsequently, the trained machine learning model can be employed to detect when an application's network behavior changes rapidly using aggregate network flow data. This allows for detecting anomalies using feasible amounts of data.

Example Network Architecture

Figure 1:
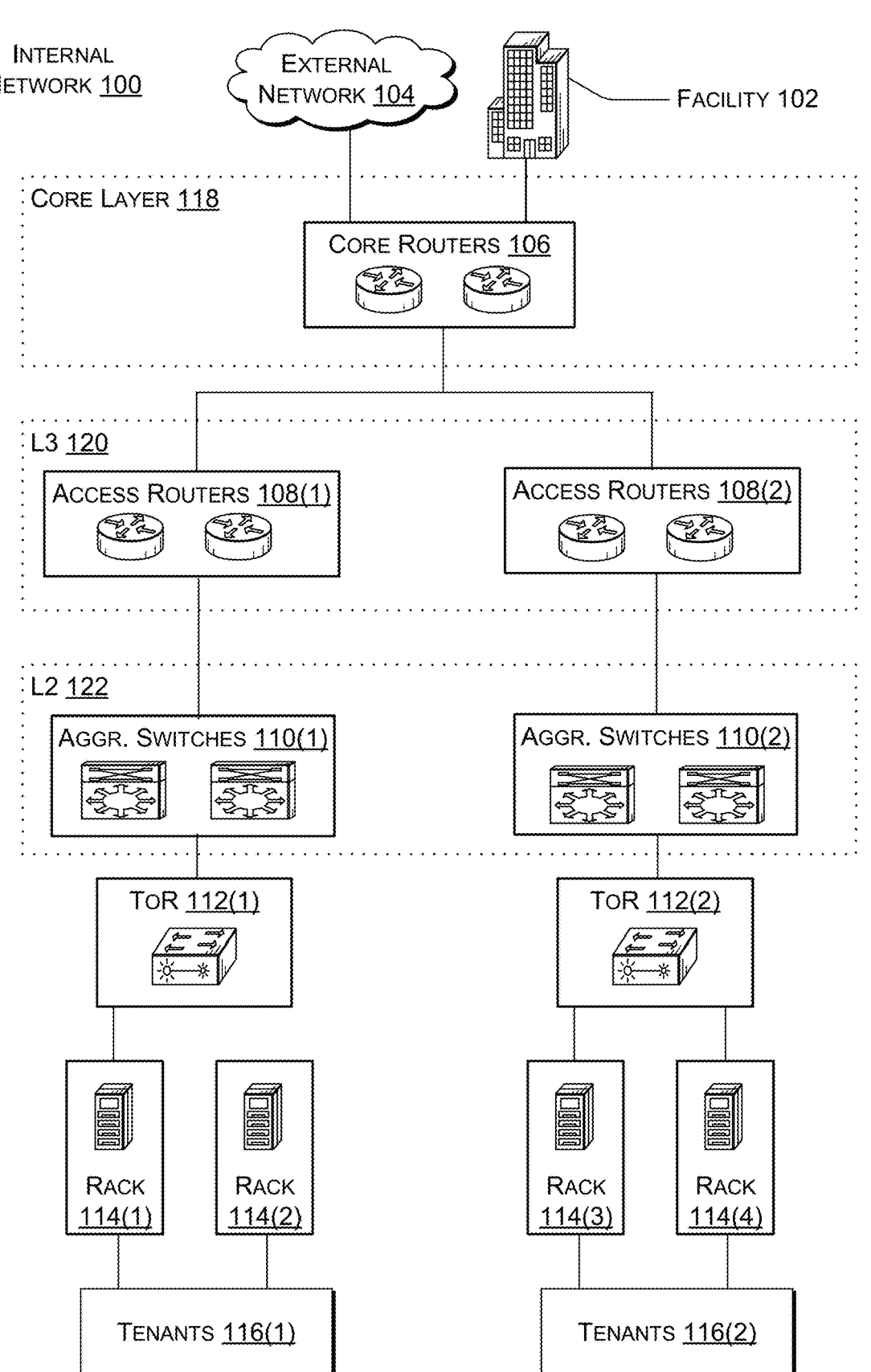
FIG. 1 illustrates an example network suitable for implementation of the present concepts.

FIG. 1 illustrates an example of an internal network 100 that can be evaluated using the concepts discussed herein.

The internal network can be manifest in a facility 102 that is connected to an external network 104, such as the Internet. In this case, the network 100 includes devices or components such as one or more core routers 106(1) and 106(2), one or more access routers 108(1) and 108(2), one or more aggregation switches 110(1) and 110(2), one or more top-of-rack (ToR) switches 112(1) and 112(2), and/or one or more racks 114(1), 114(2), 114(3), and 114(4). Each of the racks 114 can include one or more server devices that host tenants 116(1) and/or 116(2).

Note that different instances of the various devices in FIG. 1 are distinguished by parenthetical references, e.g., 112(1) refers to a different ToR switch than 112(2). When referring to multiple devices collectively, the parenthetical will not be used, e.g., ToRs 112 can refer to either or both of ToR 112(1) or ToR 112(2). Note also that internal network 100 can include various devices or components not shown in FIG. 1, e.g., various intrusion detection and prevention systems, virtual private networks (VPNs), firewalls, load balancers, etc.

From a logical standpoint, the internal network 100 can be organized into a hierarchy that includes a core layer 118, an L3 aggregation layer 120, and an L2 aggregation layer 122. This logical organization can be based on the functional separation of Layer-2 (e.g., trunking, virtual local area networks, etc.) and Layer-3 (e.g., routing) responsibilities. In FIG. 1, a limited number of network devices and applications are shown, but the disclosed implementations can be implemented with any number of networking devices and/or applications. Furthermore, note that internal network 100 is just one example, and various other network structures are possible, e.g., the concepts disclosed herein can be employed in networks that range from relatively small networks without L2/L3 aggregation to massive server farms used for high-performance cloud computing.

In some cases, network devices are deployed redundantly, e.g., multiple access routers can be deployed in redundancy groups to provide redundancy at the L3 aggregation layer 120. Likewise, in implementations with multiple aggregation switches, the multiple aggregation switches can be deployed in redundancy groups to provide redundancy at the L2 aggregation layer 122. Generally, in a redundancy group, the group contains multiple members and individual members can perform the switching/routing functions when other member(s) of the redundancy group fail.

ToRs 112 (also known as host switches) connect the servers hosted by the racks 114 to a remainder of the internal network 100. Host ports in these TOR switches can be connected upstream to the aggregation switches 110. These aggregation switches can serve as aggregation points for Layer-2 traffic and can support high-speed technologies such as 10 Gigabit Ethernet to carry large amounts of traffic (e.g., data).

Traffic from an aggregation switch 110 can be forwarded to an access router 108. The access router can use Virtual Routing and Forwarding (VRF) to create a virtual, Layer-3 environment for each tenant. Generally, tenants 116(1) and 116(2) can be software programs, such as virtual machines or applications, hosted on servers which use network devices for connectivity either internally within facility 102 or externally to other devices accessible over external network 104.

Some tenants, such as user-facing applications, may use load balancers to improve performance. Redundant pairs of load balancers can connect to an aggregation switch 110 and perform mapping between static IP addresses (exposed to clients through the Domain Name System, or DNS) and dynamic IP addresses of the servers to process user requests to tenants 116. Load balancers can support different functionalities such as network address translation, secure sockets layer or transport layer security acceleration, cookie management, and data caching.

Firewalls can be deployed in some implementations to protect applications from unwanted traffic (e.g., DOS attacks) by examining packet fields at IP (Internet Protocol) layer, transport layer, and sometimes even at the application layer against a set of defined rules. Generally, software-based firewalls can be attractive to quickly implement new features. However, hardware-based firewalls are often used in data centers to provide performance-critical features.

Virtual private networks can augment the data center network infrastructure by providing switching, optimization and security for web and client/server applications. The virtual private networks can provide secure remote access. For example, the virtual private networks can implement secure sockets layer, transport layer security, or other techniques.

Example Processing Flow

Figure 2:
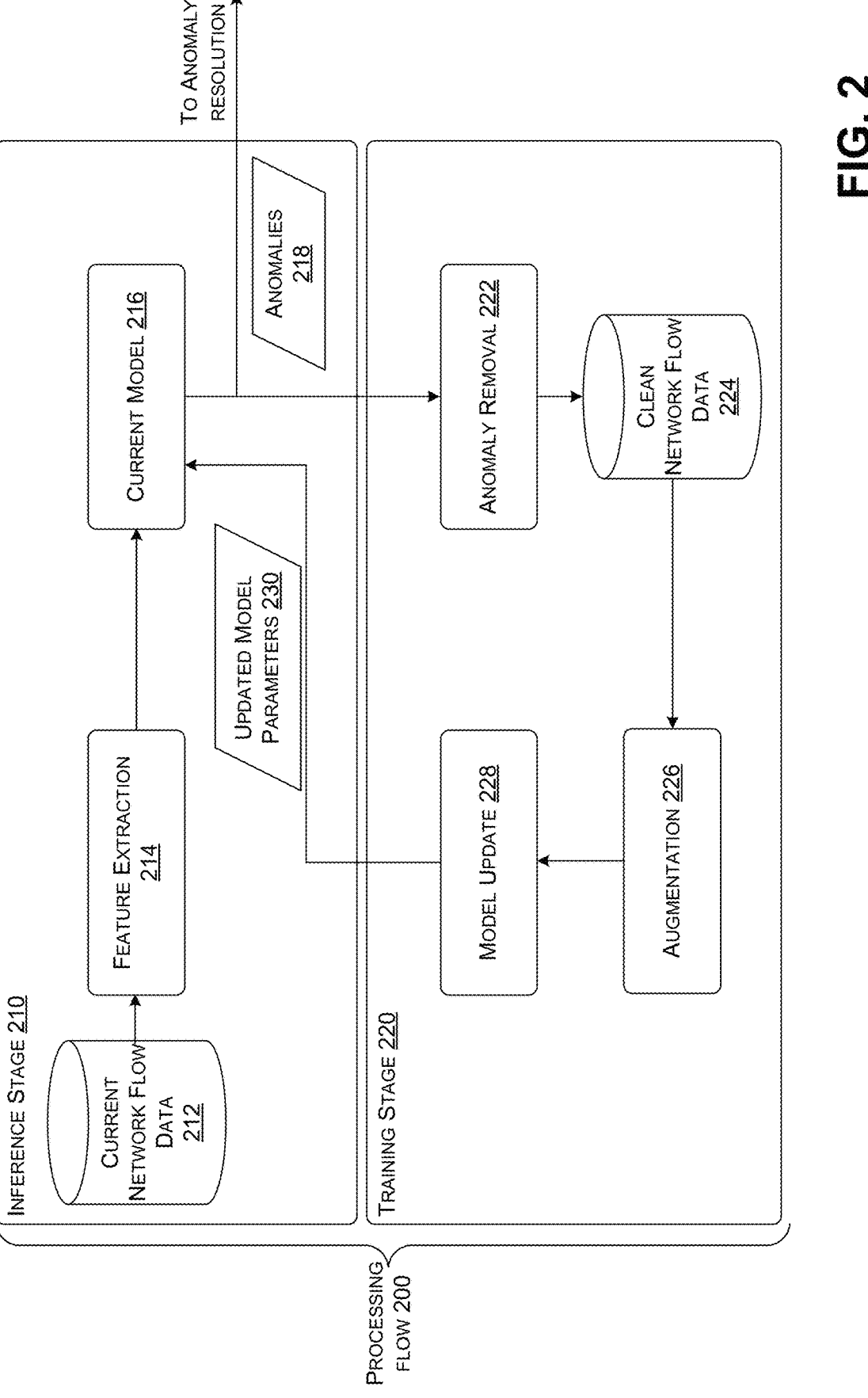
FIG. 2 illustrates an example processing flow, consistent with some implementations of the present concepts.

FIG. 2 illustrates an example processing flow 200, consistent with the disclosed implementations. Processing flow generally involves two stages, an inference stage 210 for detecting anomalous application behavior and a training stage 220 for learning typical application behavior.

Inference stage 210 involves accessing current network flow data 212. For instance, the current network flow data can reflect actual recent network communications between application instances in a network, such as a data center network. Here, an "application instance" can refer to a specific virtual machine or Internet Protocol ("IP") address. Feature extraction 214 can involve extracting aggregate statistics from the current network flow data. The aggregate statistics can include, for each pair of application instances that communicate with one another, the number of packets transmitted or received, bytes transmitted or received, number of ports used, number of TCP or UDP flows, etc. These values can be aggregated over a period of time (e.g., seconds or minutes).

The extracted features can be processed with a current model 216 to detect anomalies 218 for resolution. For instance, the current model can be the most recently trained instance of a machine learning model that is trained iteratively over time. The machine learning model can learn to represent application behavior by mapping the extracted features into embeddings. At inference time, the aggregate network flow statistics for each edge can be encoded using the current model. Then, the resulting encodings can be decoded to obtain reconstructed network flow statistics. When the reconstructed network flow statistics diverge sufficiently from the aggregate network flow statistics, an anomaly can be identified. For example, as discussed more below, in some cases a reconstruction loss can be calculated for each edge, where the reconstruction loss characterizes the difference between the aggregate network flow statistics for a given edge and the reconstructed network flow statistics.

Training stage 220 involves anomaly removal 222 to remove, from the most recent network flow data, any anomalies 218 that were detected during inference stage 210. After anomaly removal, the remaining network flow data can be stored as clean network flow data 224. Augmentation 226 is performed on the clean network flow data. For instance, augmentation can involve various augmentation strategies such as randomly removing network flow data for individual pairs of application instances, adding noise to the flow data to encourage model robustness, removing network flow data for non-application communications (e.g., communications by other services), etc. Subsequently, a model update 228 can be performed by retraining the current instance of the model on the augmented flow data to obtain updated model parameters 230. The updated model parameters can be used to update the current model 216 for a subsequent round of inference stage 210.

Example Network Graph

Figure 3:
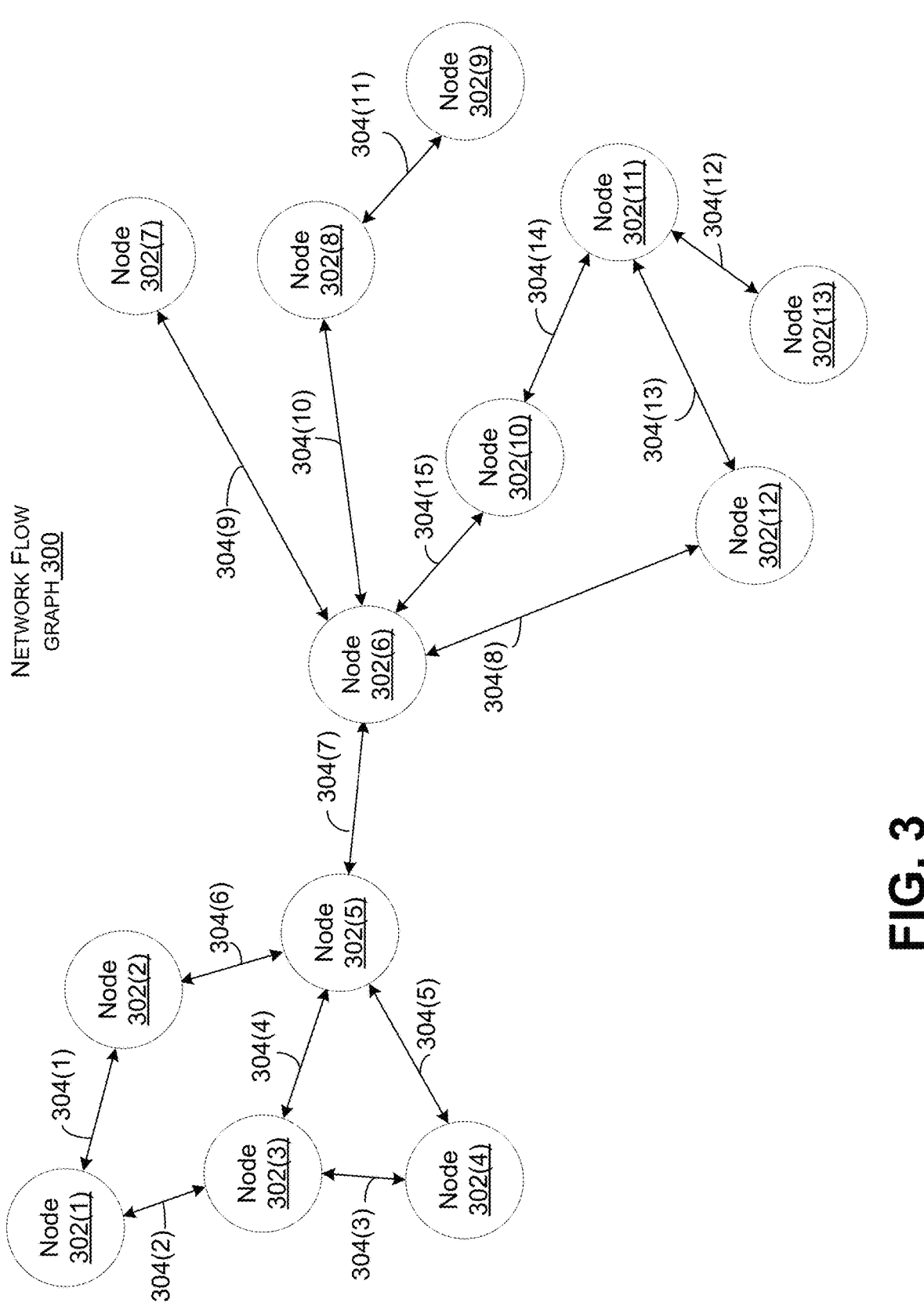
FIG. 3 illustrates an example application communication graph, consistent with some implementations of the present concepts.

FIG. 3 shows an example network flow graph 300. Nodes 302(1)-302(13) represent application instances, e.g., IP addresses or virtual machines. Edges 304(1)-304(15) represent network communication flows between each node. In some implementations, aggregate flow data is obtained for each edge in a network flow graph. Thus, the aggregate flow data includes statistical information for any two pairs of application instances that communicate in a network.

During training time, weights can be learned that can be employed to derive embeddings that characterize the communication behavior of any two communicating application instances. These learned weights can subsequently be applied to current network flow data to determine embeddings representing current communication behavior of any two communicating application instances. As discussed more below, one way to obtain embeddings involves obtaining a featured input graph and passing the feature input graph through a graph neural network having the learned weights. The graph neural network can employ the learned weights to output respective embeddings for each edge of the featurized input graph.

Specific Algorithm

The following describes a specific implementation of the concepts discussed herein. This specific implementation is referred to below as NetVigil. The disclosed techniques provide a robust and cost-efficient anomaly detection system suitable for internal or "east-west" traffic within data center networks. NetVigil extracts security-focused, graph-based features from network flow logs and employs domain-specific graph neural networks (GNNs) and contrastive learning techniques to strengthen its resilience against normal traffic variations and adversarial evasion strategies. As discussed more below, NetVigil has been evaluated over various attack scenarios and traces from real-world production clusters, illustrating that NetVigil delivers significant improvements in accuracy, cost, and detection latency compared to state-of-the-art anomaly detection systems, providing a valuable security mechanism that can protect the east-west traffic within data center networks.

NetVigil accomplishes at least the following objectives: (a) providing cost-effectiveness when monitoring numerous nodes, (b) identifying anomalous behaviors while reducing false alarms, and (c) demonstrating robustness to normal traffic changes without necessarily depending on prior knowledge of malicious attacks.

NetVigil achieves these objectives using several concepts, the first of which involves deriving security-focused graph features from network flow records. To provide cost-efficiency, NetVigil leverages low-cost, agentless network flow records such as Virtual Private Cloud (VPC) Flow Logs ("Amazon. Logging IP traffic using VPC Flow Logs," https://docs.aws.amazon.com/vpc/latest/userguide/flow-logs.html, retrieved on 2023-04) in Amazon Web Services (AWS) and Network Security Group (NSG) Flow Logs ("Microsoft. Flow logs for network security groups," https://learn.microsoft.com/en-us/azure/network-watcher/network-watcher-nsg-flow-logging-overview, retrieved on 2023-04) in Microsoft Azure. These loggers provide substantial cost savings over packet traces by utilizing aggregation intervals. NetVigil extracts security-oriented graph features from each virtual network or subscription, effectively compensating for the absence of packet-level information. This approach enables scalable monitoring of large networks without sacrificing anomaly detection accuracy.

Second, NetVigil can leverage graph neural networks (GNNs) and domain-specialized contrastive learning for context-aware robust anomaly detection. NetVigil employs GNNs to model complex relationships between nodes in the network. Note that different nodes in an application (e.g., microservices) within a network can carry diverse contextual information. By integrating contextual information from adjacent nodes, GNNs can detect anomalous behaviors that might be overlooked by traditional solutions focusing on individual flows. As discussed more below, NetVigil adopts graph contrastive learning with domain-specialized data augmentation. This approach guides the model toward capturing meaningful representations of standard traffic patterns, effectively enabling the model to distinguish between benign and malicious behaviors with greater precision.

Third, NetVigil adapts to temporal dynamics via smoothing and continuous retraining. NetVigil addresses the evolving nature of network traffic by integrating a temporal loss that encourages similarity between embeddings of temporally-adjacent graphs. Moreover, NetVigil continuously retrains its model using recent clean logs by excluding anomalous flows. This approach allows the model to remain up-to-date with the latest network behavior, thereby maintaining high detection accuracy over extended periods.

Implementation and Evaluation

NetVigil was constructed as an end-to-end streaming data pipeline that continuously analyzes network flow logs and dynamically updates a model used to detect anomalies. To evaluate the effectiveness of NetVigil, a new east-west security benchmark suite, IntraSecureBench, was designed using a microservice demo application. Online boutique, https://github.com/GoogleCloudPlatform/microservices-demo, retrieved on 2022-07. A diverse array of live traces and simulated evasive attack scenarios was generated. The evaluation, including the benchmark suite and traces from week-long to month-long production clusters, demonstrates that NetVigil significantly outperforms two existing malicious traffic detectors discussed more below. NetVigil achieved an average AUC (area under the receiver operating characteristic or "ROC" Curve) improvement of 33.7% (up to 65.3%) and reduces operational costs by 1.8-16.7×for the 16-VM deployment.

NetVigil secures east-west data center networks with cost efficiency and robustness against normal traffic fluctuations. NetVigil achieves low operational costs by extracting security-oriented graph features from network flow records, thereby mitigating any dependence on fine-grained but expensive network packet traces. To compensate for the absence of packet-level information, NetVigil employs graph neural networks (GNNs) to learn contextual information from the network topology. Furthermore, NetVigil incorporates domain-specific graph contrastive learning and temporal smoothing techniques to achieve high detection accuracy while maintaining low false alarm rates.

Figure 4:
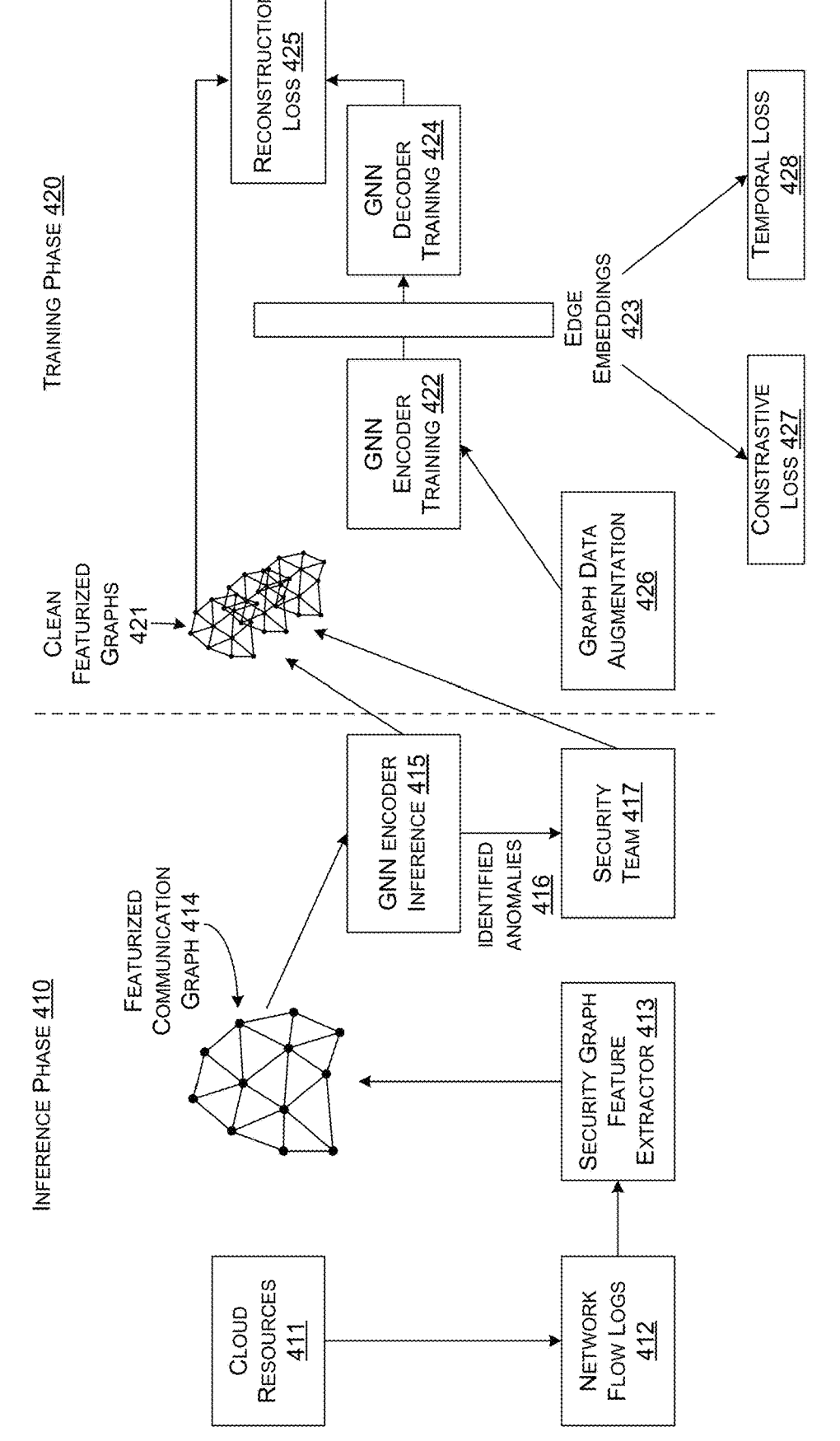
FIG. 4 illustrates a specific architecture that can be employed to detect anomalies from aggregate network flow data, consistent with some implementations of the present concepts.

FIG. 4 provides an overview of an architecture 400 that can be employed to implement NetVigil. During inference phase 410, cloud resources 411 (e.g., virtual machines (VMs) and compute clusters) continuously generate network flow logs 412, such as VPC or NSG flow logs as mentioned previously, at intervals ranging from tens of seconds to minutes. These network flow logs are processed by a security graph feature extractor 413, which groups network flow logs based on their IP addresses, extracts features, and transforms the results into a featurized communication graph 414. In this graph, each node represents an IP address, and each edge summarizes all flows between respective IP pairs. NetVigil subsequently feeds this featurized communication graph into GNN encoder inference 415, where a trained GNN encoder is employed to compute anomaly scores (e.g., reconstruction loss) for each edge. Edges identified as potentially anomalous, along with the corresponding communication graphs and network flow logs, are then forwarded as identified anomalies 416 to a security team 417 for further investigation.

Training phase 420 is performed over multiple retraining intervals, each of which typically spans hours or days based on network dynamics. NetVigil gathers clean featurized graphs 421 from the inference phase (i.e., excluding anomalous nodes and edges detected by the model) to perform GNN encoder training 422, the GNN encoder learns to compress the features of each edge and its incident nodes into edge embeddings 423. GNN decoder training 424 trains a GNN decoder to reconstruct these features with low reconstruction loss 425, which corresponds to the difference between the actual network flow data and reconstructed network flow data, derived by decoding an embedding with the GNN decoder.

To enhance robustness, graph data augmentation 426 can encourage similarity between the embeddings of original and augmented graphs by reducing contrastive loss 427. In addition, a temporal loss 428 is employed to promote embedding similarity between temporally-adjacent graphs. The entire training process is conducted end-to-end, resulting in an up-to-date GNN autoencoder for the subsequent inference phase.

The security graph feature extractor 413 can gather security-oriented features from network flow logs 412, providing cost efficiency while maintaining essential information for downstream anomaly detection. Within each aggregation interval (e.g., one minute), network flow logs typically contain the following information: (a) 5-tuple data, encompassing protocol, source and destination IP addresses, and source and destination ports, (b) the number of transmitted and received packets, and (c) the volume of transmitted and received bytes.

The security graph feature extractor 413 can operate at the IP address level instead of the network flow (IP and port) level for two primary reasons. First, operating at the network flow level leads to much larger graphs and increases the burden on both inference and training processes. For instance, there can be orders of magnitude increases in the number of nodes and edges in production traces when constructing communication graphs at the network flow level (139 k nodes and 115 k edges) compared to the IP level (300 nodes and 10-20 k edges). Furthermore, aggregating at the IP address level facilitates the identification of correlations between flows associated with the same IP address (e.g., a notable increase in the number of flows or usage of different ports). This, in turn, simplifies the detection of anomalous attacks, such as port scanning.

The security graph feature extractor 413 offers additional operational cost reductions through a tunable detection window (e.g., two or three minutes). By generating a single communication graph per detection window, the feature extractor effectively balances detection latency with cost efficiency. Although a larger detection window might marginally impact detection accuracy for evasive attacks, this approach enables network operators to harmonize the requirement for prompt detection with limited resource constraints. Consequently, it becomes a suitable solution for large-scale network monitoring and security applications.

TABLE 1

| Feature | Statistics |
| --- | --- |
| Number of transmitted packets | min, max, mean, |
| Number of received packets | sum, std |
| Total received bytes | |
| Total transmitted bytes | |
| Number of TCP flows | count |
| Number of UDP flows | |
| Number of local unseen ports | |
| Number of global unseen ports | |
| Number of ports | | summarizes the features obtained for each distinct IP pair. Ephemeral ports can be excluded from the port-related features, as they do not provide learnable information. To determine the number of unseen ports, the globally seen ports can be tracked across all flows as well as the locally seen ports for each IP pair within the training dataset. By maintaining port information as statistics, the feature extractor can function at the IP address level without sacrificing essential information. This approach allows capturing of crucial correlations among distinct flows associated with the same IP address while maintaining scalability and facilitating the detection of anomalous attacks involving multiple flows.

To compensate for the missing packet-level information, NetVigil learns relationships among network nodes using graph neural networks (GNNs). One insight is that nodes in the communication graph can be mapped to different roles in an application and, as a result, each node exhibits a particular pattern over time. This contextual information allows NetVigil to detect anomalous behaviors that might appear to be normal if examined separately (e.g., botnets or DNS amplification). NetVigil can aggregate edge features on each node as contextual information, and then concatenate the original edge features with this contextual information as the input to our edge encoder. NetVigil employs an encoder that can map each concatenated edge feature into a compressed embedding space.

The following Algorithm 1:

ALGORITHM 1

GNN Autoencoder for Edge Embedding

| Input: | Graph $g(\mathbb{V}, \mathbb{E})$ |
| --- | --- |
| Input: | Edge features $e_{uv}$, $\forall uv \in \mathbb{E}$ |
| Input: | Number of autoencoder layers L |
| Input: | Encoder/decoder weights |
| | $W_E{}^l, W_D{}^l, \forall l \in 1,...,L$ |
| 1: | for $v \in \mathbb{V}$                 ▷ Aggregate neighboring edge features |
| 2: | $h_{N(v)} \leftarrow AGG(e_{uv}, \forall u \in N(v), (u, v) \in \mathbb{E})$ |
| 3: | end for |
| 4: | for $(u, v) \in \mathbb{E}$ do |

ALGORITHM 1-continued

| GNN Autoencoder for Edge Embedding |
|---|

```
5:        h_uv^0 ← CONCAT(h_u, e_uv)
6:        for l ∈ 1,...,L do              ▷ Edge Encoder
7:            h_uv^l ← σ(W_E^l · h_uv^{l-1})
8:        end for
9:        z_uv = h_uv^L                   ▷ Edge embedding
10:   end for
11:   for v ∈ 𝕍                          ▷ Broadcast edge embedding
12:        h_N(v) < AGG(z_uv, ∀u ∈ N(v), (u, v) ∈ 𝔼)
13:   end for
14:   for (u, v) ∈ 𝔼 do
15:        h_e_uv^0 ← CONCAT(h_u, e_uv)
16:        for l ∈ 1,...,L do              ▷ Edge Decoder
17:            h_uv^l ← σ(W_D^l · h_uv^{l-1})
18:        end for
19:        ẽ_uv = h_uv^L                   ▷ Reconstructed
                                              edge features
20:   end for
``` provides the pseudocode for the GNN encoder. Lines 1-3 aggregate edge features using an AGG function, which can be mean, median, or element-wise pooling. Line 5 concatenates the aggregated contextual information with the original edge features, and Lines 6-8 encode the concatenated edge features into edge embeddings (Line 9). Lines 11-19 decode the embeddings back to the original edge features, and the reconstruction loss between $e_{uv}$ and $\tilde{e}_{uv}$ is determined. Formally, for a (mini) batch $\mathcal{B}(\mathcal{G})$ of graphs, reconstruction loss 425 can be calculated during training as:

$$L_1 = \frac{1}{\Sigma_{i|\mathcal{G}_i \in \mathcal{B}(\mathcal{G})}|\mathbb{E}_i|} \Sigma_{i|\mathcal{G}_i \in \mathcal{B}(\mathcal{G})} \Sigma_{(u,v) \in \mathbb{E}_i} \|e_{uv} - \tilde{e}_{uv}\|^2, \quad (1)$$

where $\mathbb{E}_i$ corresponds to the edge set of $\mathcal{G}_i$.

At inference time, reconstruction loss is calculated for each edge as $\|e_{uv} - e_{uv}\|^2$. To detect an anomaly, the maximum reconstruction loss seen during training can be multiplied by some constant factor, e.g., 1.2, to obtain a threshold. Then, any edge with a reconstruction loss exceeding that threshold can be designated as anomalous. Thus, reconstruction loss can serve as an anomaly score at inference time.

Note that NetVigil employs graph convolutional networks (GCNs) (Kipf et al., "*Semi-supervised classification with graph convolutional networks*," In International Conference on Learning Representations, 2017). However, the GNN architecture can be interchangeable, particularly if the encoder takes into account both original edge features and aggregated neighboring features. The conducted experiments did not show a significant gain in detection accuracy from using additional convolutional layers or alternate GNN architectures.

One of the challenges faced by existing network anomaly detectors is the generation of numerous false alarms for normal changes that were not encountered during the training process. One plausible approach to address this issue involves curating an extensive long-term dataset for training, with the expectation that all normal behaviors will be encompassed within this dataset. However, this approach is not scalable for east-west traffic in cloud deployments, as they frequently experience normal changes, such as configuration updates, load variations, and node failures. As noted previously, NetVigil employs graph contrastive learning (Liu, et al., "*Graph self-supervised learning: A survey*," IEEE Transactions on Knowledge and Data Engineering, 35 (6): 5879-5900, 2023; and You, et al., "*Graph contrastive*

*learning with augmentations*," Advances in neural information processing systems (NeurIPS), 33, 2020), which augments the training data with general and domain-specific perturbations to enhance the model's generality. This approach allows the model to better accommodate and adapt to the dynamic nature of network traffic, thereby reducing the incidence of false alarms while accurately detecting genuine anomalies.

The following data augmentation strategies were utilized to improve the performance of the model and enable the model to adapt to various network conditions:

Randomly removing edges and nodes: By presenting subgraphs to the model, the system gains the ability to more effectively analyze network communication patterns, attributable to the simplified structure and reduced noise.

Adding noise to edge features: Edge features, such as the number of packets and the volume of transmitted/received bytes, are perturbed to test the model's robustness against variations in feature values.

Removing non-application edges: It has been observed that application traffic within the network exhibits greater predictability compared to inter-service communications. Consequently, by removing nodes and edges unrelated to the application running within the network, the model can better learn and recognize application-level communication patterns, thereby enhancing its robustness and reducing the occurrence of false positives.

Formally, during training, a minibatch $\mathcal{B}(\mathcal{G})$ of graphs is randomly sampled. For every graph $\mathcal{G} \in \mathcal{B}(\mathcal{G})$, two augmented versions $\mathcal{G}^{(1)}$ and $\mathcal{G}^{(2)}$ are generated by randomly selecting two of the data augmentation strategies mentioned above. Denote the corresponding embeddings of an edge $uv \in \mathbb{E}$ by $$z_{uv}^{(1)} \text{ and } z_{uv}^{(2)};$$

see Line 9 in Algorithm 4.2. Recalling that the cosine similarity between two vectors x and y is given by $\cos(x, y) = x^T y/(\|x\|\|y\|)$, the contrastive loss of a given edge $uv$ can be defined as:

$$\ell_{uv} = -\log\left(\frac{\exp(2\cos(z_{uv}^{(1)}, z_{uv}^{(2)}))}{\Sigma_{u'v'}\exp(2\cos(z_{uv}^{(1)}, z_{u'v'}^{(2)}))}\right), \quad (2)$$

where the negative edges $u'v'$ are randomly selected from augmented versions of other graphs in the minibatch. Notice that minimizing $\ell_{uv}$, promotes $$z_{uv}^{(1)} \text{ and } z_{uv}^{(2)}$$

to be similar, i.e., the embeddings corresponding to the same edge for two different augmented versions should be close to each other. Moreover, minimizing $\ell_{uv}$ also promotes $$z_{uv}^{(1)} \text{ and } z_{u'v'}^{(2)}$$

11

12

(the embeddings of different edges in augmented versions of different graphs) to be different from each other. In this way, the collapse of different embeddings into a common representation can be avoided, and the model is encouraged toward the full utilization of the embedding space. The contrastive loss 427 is given by the average value of $\ell_{uv}$ over all edges in the minibatch:

$$L_2 = \frac{1}{\sum_{i|\mathcal{G}_i \in \mathcal{B}(\mathcal{G})}|\mathbb{E}_i|}\sum_{i|\mathcal{G}_i \in \mathcal{B}(\mathcal{G})}\sum_{uv \in \mathbb{E}_i}\ell_{uv}, \qquad (3)$$

Where $\mathbb{E}_i$ corresponds to the edge set of $\mathcal{G}_i$. As defined, the loss $L_2$ depends on the randomly selected augmentation strategies to compute the contrastive pairs of every graph. During training, new augmentation strategies for every new minibatch can be randomly drawn. In this way, every gradient step is taken based on new contrastive pairs, further promoting generalization.

NetVigil can also capture temporal dynamics. Through analysis of several traces from production clusters, network traffic within a short time window (e.g., minutes) tends to exhibit similarity, while patterns can undergo significant changes over longer periods (e.g., hours or days). This observation aligns with the understanding that major network traffic changes are typically driven by rare events (e.g., failures), periodicity (e.g., time of day), or application changes (e.g., code updates), which do not generally occur within short time frames.

These temporal dynamics are incorporated into NetVigil with a two-fold strategy. First, define temporal loss 428 during training to encourage embedding similarity between temporal adjacent graphs. For every pair of temporally adjacent graphs $\mathcal{G}^t$ and $\mathcal{G}^{t+1}$, minimize the norm of the difference between consecutive embeddings of the same edge to obtain the temporal loss:

$$L_3 = \frac{1}{\sum_t|\mathbb{E}_t \cap \mathbb{E}_{t+1}|}\sum_t\sum_{uv|uv \in \mathbb{E}_t \cap \mathbb{E}_{t+1}}\left\|z_{uv}^t - z_{uv}^{t+1}\right\|^2, \qquad (4)$$

where $\mathbb{E}_t$ denotes the edge set of $\mathcal{G}^t$. Minimizing $L_3$ encourages embeddings of the same edge in two consecutive time steps to be close to each other. Notice that, as a result of the dynamic nature of the graph, it might be that an edge uv that exists at time t is no longer present at time t+1. Hence, in equation (4), this is accounted for by only considering edges that belong to the intersection of two consecutive edge sets.

Second, a periodic training procedure (e.g., hours or days) can be employed to update the model with the most recent traffic patterns. In each retraining window, clean communication graphs (i.e., nodes and edges without any potential anomalies) can be compiled during inference, as well as the false alarms cleared by a security team, to form the training set. Subsequently, the model can be retrained by minimizing the composite loss, $\mathcal{L}$, which combines the reconstruction loss $L_1$, contrastive loss $L_2$, and temporal loss $L_3$. The composite loss is defined as $\mathcal{L} = L_1 + \alpha L_2 + \beta L_3$, where $\alpha$ and $\beta$ are hyperparameters that trade off the relative importance of the different losses. This approach ensures that the model remains up-to-date and can effectively detect and adapt to genuine anomalies and fluctuations in network traffic patterns.

Evaluation

Attack datasets. Many existing datasets for network intrusion detection consist of packet traces. However, performing inference on each packet leads to high overheads. NetVigil uses flow-level logs, which significantly reduce processing time. To demonstrate the efficiency and practicality of our system, the NetVigil anomaly detection pipeline was run on live traces collected from two different networks: a 16-VM testbed and a large-scale production environment.

For the 16-VM testbed, a web-based e-commerce application was employed. The application allows users to browse items, add them to the cart, and purchase them. The application consists of 11 microservices as well as a load generator to send GET and POST requests to the application to mimic user behavior.

This system was tested against 13 different attacks that faithfully represent various types of malicious network behavior. FIG. 5 shows an attack dataset table 500 that lists all the attacks that were employed. Traditional malicious network activities were employed, such as different variants of port scanning and DOS attacks. In addition, more complicated attacks that span numerous nodes were employed, such as botnet attacks, distributed scanning, and Infection Monkey ("Infection monkey," https://www.akamai.com/infectionmonkey, Retrieved on 2023-03). Examining each IP-to-IP communication in isolation is insufficient since it does not consider a holistic and comprehensive view of the network. Each trace lasts for 1-2 hours, and each dataset was labeled by dividing it into 2-minute windows. A connection was marked as anomalous if any malicious traffic is sent or received between the two nodes.

Implementation. NetVigil was implemented as an end-to-end data streaming pipeline using 1,400 lines of Python code. The inference pipeline extracts featurized communication graphs utilizing NetworkX ("NetworkX: network analysis in python," https://networkx.org/, Retrieved on 2023-01) and pandas ("pandas—python data analysis library," https://pandas.pydata.org/, Retrieved on 2023-01) libraries, while the training pipeline is built on PyTorch ("PyTorch," https://pytorch.org/, Retrieved on 2022-11) and the Deep Graph Library (DGL) ("Deep Graph Library," https://www.dgl.ai/, Retrieved on 2022-11).

Baselines. NetVigil was compared against two state-of-the-art intrusion detection systems: Kitsune (Mirsky, et al., "*Kitsune: An ensemble of autoencoders for online network intrusion detection*," In 25th Annual Network and Distributed System Security Symposium (NDSS), 2018) and Whisper (Fu, et al., "*Realtime robust malicious traffic detection via frequency domain Analysis*," In Proceedings of the ACM SIGSAC Conference on Computer and Communications Security (CCS), 2021). To evaluate Kitsune on the datasets, its autoencoders were modified to ingest flow-level features and it was optimized to speed execution. This optimized version of Kitsune is referred to below as Kitsune+. Whisper's frequency domain analysis also requires packet-level traces, but it is much more difficult to modify it to use connection-level traces because it computes frequency domain analysis on packets in each flow and would not be effective if given a single data point (just the aggregated flow-level statistics). To get Whisper to work on the dataset, these aggregated flow-level statistics (e.g., the number of packets sent/received over the length of the connection) were used to convert the flow-level traces to packet data.

Metrics. To evaluate NetVigil, the area under the ROC curve (AUC) was employed as the primary metric, along with the true positive rate (TPR) and false positive rate (FPR). Importantly, AUC provides a measure of how well the detector can distinguish between the positive and negative classes, across all possible threshold settings. TPR and FPR are also useful because it can be beneficial to detect many or all anomalies with relatively few false alarms. False alarms can significantly lower trust in an anomaly detector and avoiding false alarms is a fundamental challenge due to the dynamism of network traffic. Additionally, latencies in running each anomaly detector were compared. All latency experiments were run on a single 36-core, 72-hyperthread, 256-GB RAM machine (Intel (R) Xeon (R) Gold 5220).

The detection accuracy of NetVigil with the baselines, Kitsune+ and Whisper, was compared. For all attacks except one, NetVigil yields significantly higher performance over the baselines with AUC scores ranging from 0.8915 to 1.000, resulting in AUC improvements of 0.0545 to 0.6591 over Kitsune+ and 0.0852 to 0.6226 over Whisper. FIG. 6 shows overall results table 600, which presents the overall results for AUC, TPR, and FPR. Observe that NetVigil outperforms the baselines because of two factors: (1) the novel security-centric feature extractor that effectively identifies lower-level malicious traffic characteristics in each connection that adversaries employ to fly under the radar, and (2) the use of graphs and a GNN architecture to obtain a holistic and comprehensive view of network behavioral patterns across many nodes.

Illustrating the efficacy of the feature selection approach, NetVigil exhibits strong performance in identifying distributed denial of service (DDoS) attacks and vertical port scanning, achieving an AUC greater than 0.98 and an FPR approaching 0.0 for SYN Flood, SYN Flood DDoS, UDP DDoS, and Vertical Port Scanning. The extraction of packet- and connection-level statistics facilitates the detection of abnormal communications, such as substantial quantity of initiated connections in the SYN Flood scenario and the packet volume in other DDoS attacks.

Figures 7A, 7B, 7C:
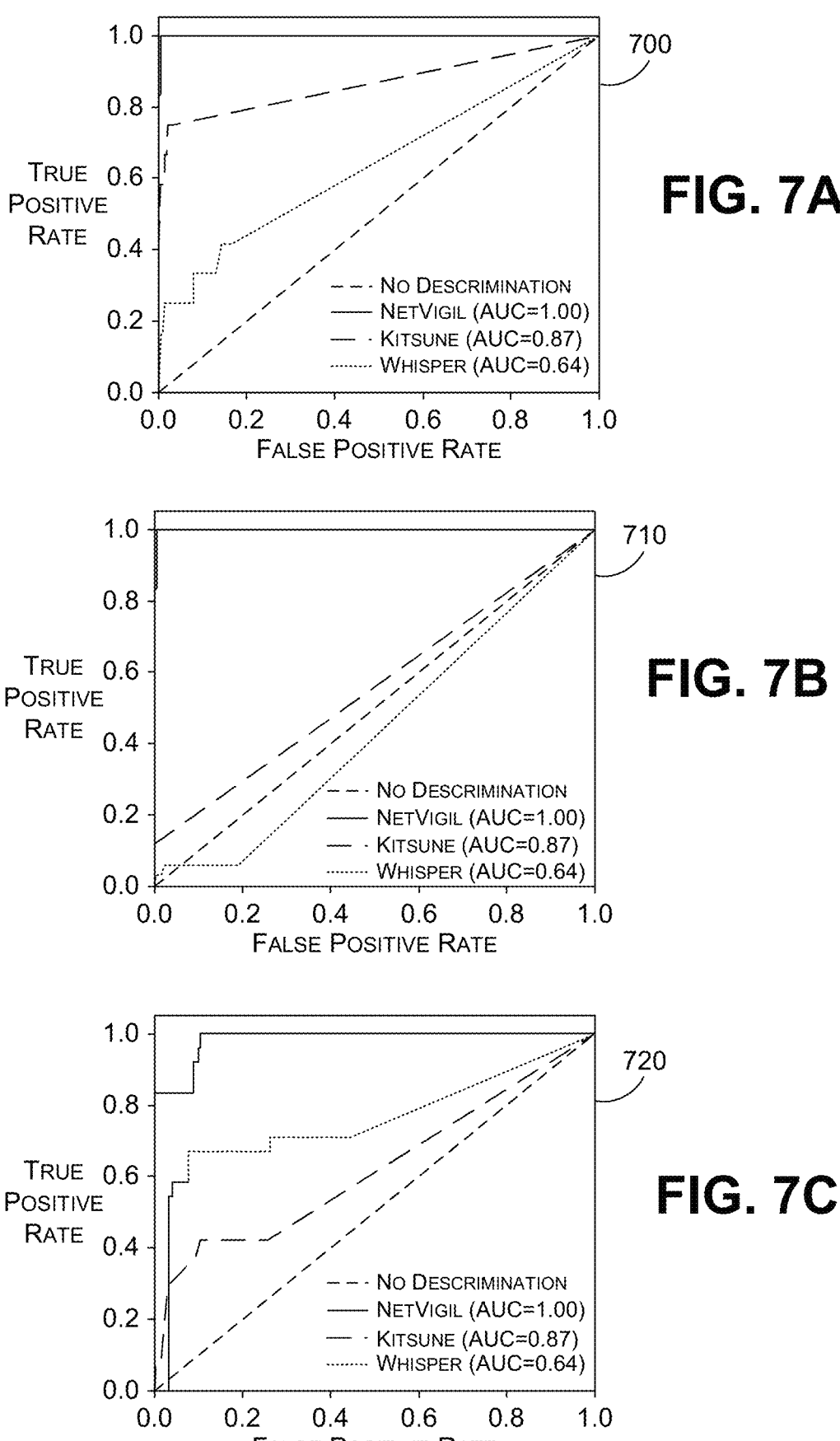

The GNN architecture excels in detecting reconnaissance patterns that span multiple nodes, an area where Kitsune+ and Whisper baselines demonstrate subpar performance. For Distributed Port Scan, Distributed Stealth Port Scan, and Distributed UDP Port Scan, Kitsune+ and Whisper yield AUC scores of 0.4059, 0.7542, 0.3367 0.3961, 0.6186, and 0.3732, respectively. These scans involve an adversary probing a selected number of ports across various victim machines. The low traffic volume and variation from these network patterns enable them to evade detection. Similarly, these baseline models exhibit inadequate performance in detecting infection monkey attacks due to similar reasons. FIG. 7A shows a results graph 700 conveying results for a UDP DDoS (User Datagram Protocol Distributed Denial of Service) attach, FIG. 7B shows a results graph 710 for the Invention Monkey 1, attack, and FIG. 7C shows a results graph 720 for a Distributed Stealth Port Scan attack.

In contrast to these efforts, NetVigil uses its feature extractor in tandem with a graphical view of the network to successfully identify these scans and attacks. The features include previously unseen ports, a key characteristic in many scans and attacks. NetVigil also analyzes the number of ports as well as statistics on the number of bytes and packets that are sent/received. A large number of different ports with a comparatively small amount of traffic volume can be indicative of port scanning or of an adversary attempting multiple different exploits that target different ports/services. Furthermore, the GNN architecture detects higher-level behavioral patterns and relationships, rather than just relying on detecting each connection in isolation, as traditional host-based intrusion detection systems do. This is useful for detecting distributed port scanning and infection monkey attacks since, contrary to vertical port scanning and DOS attacks, each individual connection exhibits little abnormality in volume and variation, but each malicious actor makes connections to many different hosts, deviating from their typical communication patterns.

Figure 8A:
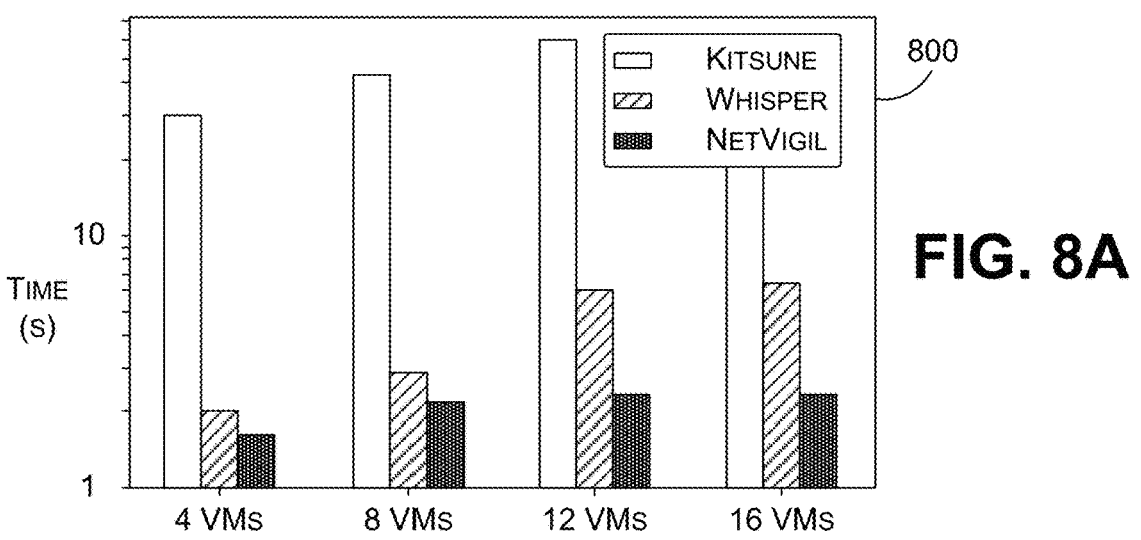
Figure 8B:
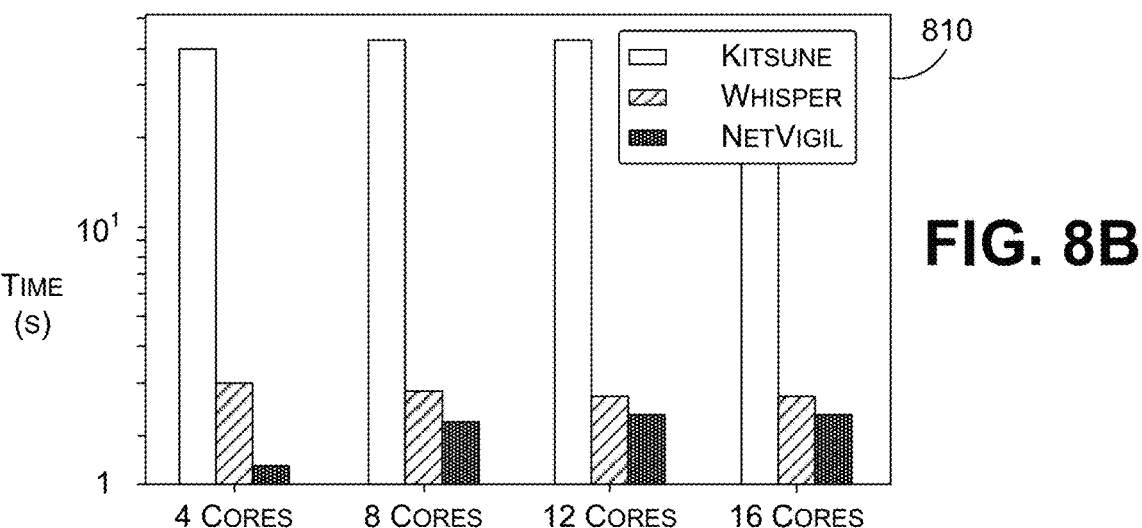
Figure 8C:
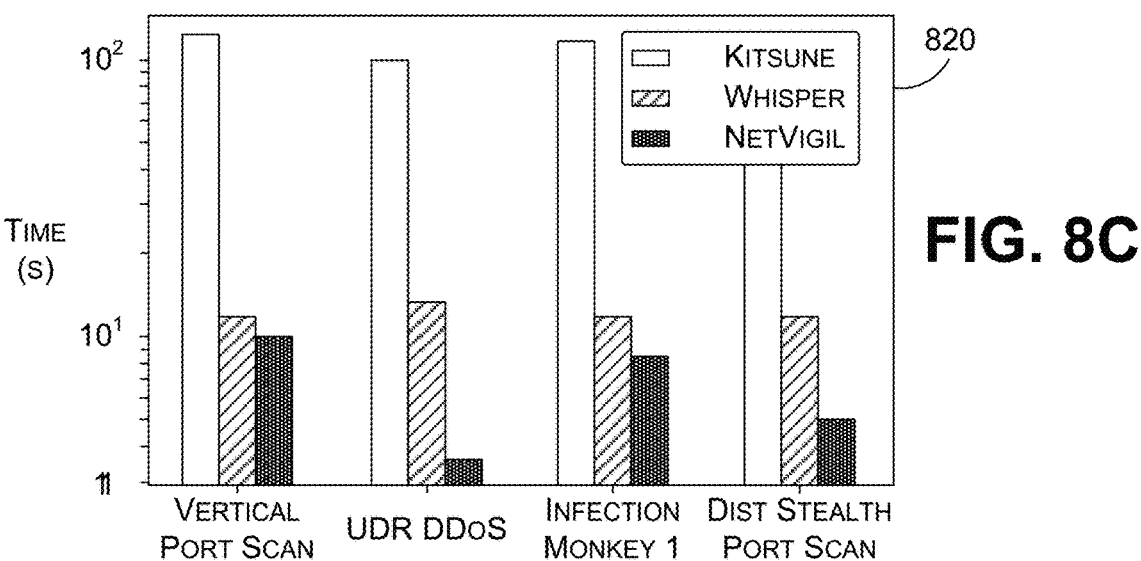
Figure 9A:
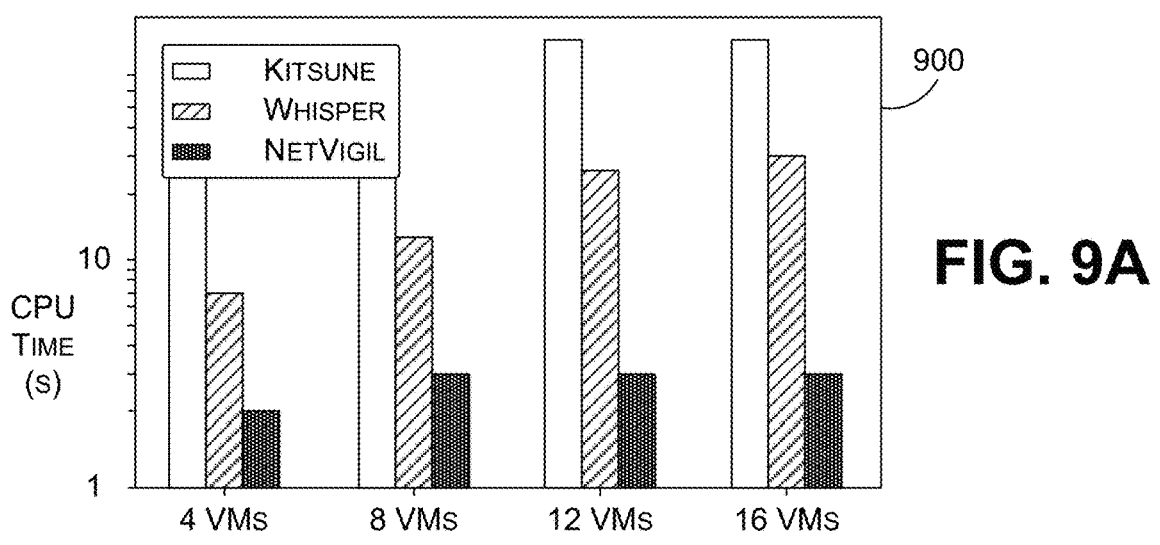
Figure 9B:
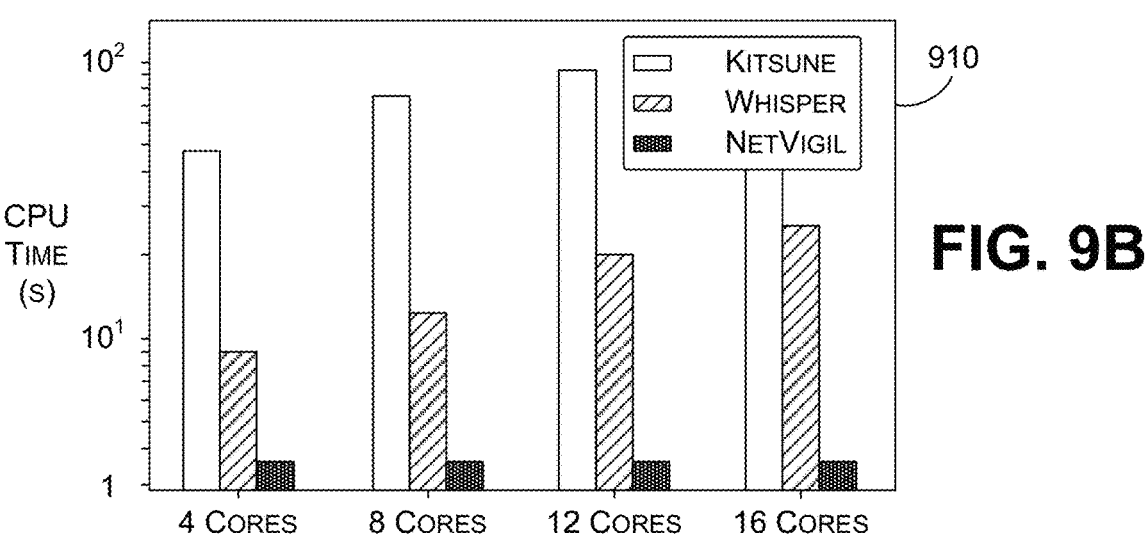
Figure 9C:
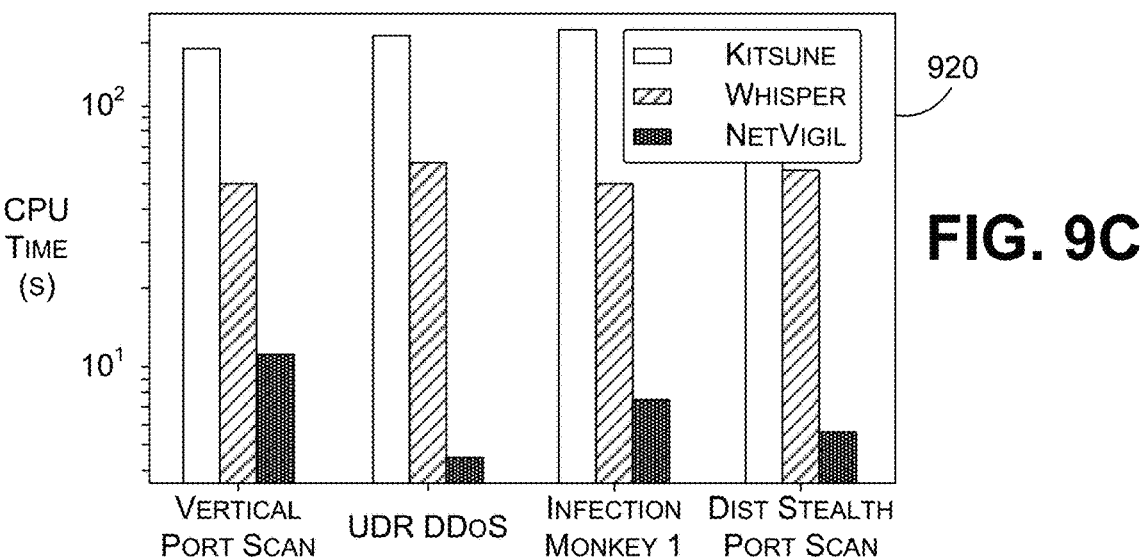

FIG. 8A shows wall clock results graph 800, FIG. 8B shows wall clock results graph 810, and FIG. 8C shows wall clock results graph 820. FIG. 9A shows cpu detection time results graph 900, FIG. 9B shows cpu detection time results graph 910, and FIG. 9C shows cpu detection time results graph 920. These graphs convey the efficiency of NetVigil compared to Kitsune+ and Whisper for a 2-minute window of data across varying log sizes (specified as number of VMs in the trace), cores allocated, and type of attack trace. NetVigil achieves key performance improvements through the following features:

1. Using flow-based features instead of packet-level data, reducing the amount of data significantly since only the aggregated statistics for each flow need to be processed.
2. Using a graph-based representation that aggregates and normalizes features across multiple instances of the same connection.
3. An efficient GNN architecture with an autoencoder of two fully-connected layers.

Due to these components, the majority of time in NetVigil processing spent is during feature extraction. GNN inference takes only 2-3 seconds on average for a network trace with 16 VMs. Across 4 different attack traces, NetVigil achieves significantly lower execution times, yielding speedups of $\geq$11.96$\times$ and 1.18$\times$-3.82$\times$ over Kitsune+ and Whisper, respectively, for wall clock latency, and speedups of $\geq$16.88$\times$ and 4.32$\times$-15.13$\times$ for CPU time when 8 cores are allocated.

NetVigil's scalability to larger network log sizes was also demonstrated. With a trace of 4 VMs, it takes 123 seconds for Whisper and 96 seconds for NetVigil. As the trace size increases, the execution time of Whisper also increases, resulting in 373 seconds to process a trace with 16 VMs. Meanwhile, the execution time of NetVigil only increases slightly to 140 seconds. Furthermore, as Whisper is allocated more cores, the CPU time increases from 508 seconds for 4 cores to 1520 seconds for 16 cores, while the wall clock time decreases marginally from 173 seconds with 4 cores to 164 seconds with 8 cores. In contrast, the runtime of NetVigil remains relatively stable when changing the number of allocated cores since it does not rely on parallelism for efficiency.

Network flow records were collected from two first-party compute clusters. The first cluster, Service-Cluster, contains approximately 400 VMs, and traces were gathered for a week. The second cluster, Compute-Cluster, consists of around 200 VMs, and traces were acquired for two months. It was confirmed no known attacks are present in these traces and they were employed to evaluate the false alarm rate of NetVigil.

The number of false alarms without model retraining was assessed. For Service-Cluster, there are 4,356 false alarms on the last day of the week if the model is not retrained, while model retraining reduces false alarms to 10. For Compute-Cluster, there are 1,231 false alarms without model retraining at the end of the week, and the number increases to 2,315 on the last day of the month. This cluster has less activity than Service-Cluster, explaining the lower dynamics. Model retraining reduces false alarms to fewer than 5 per day. The results from both product traces validate the importance of continuous retraining.

Additionally, attack traces were injected into these production records to examine the performance of NetVigil. Infection Monkey 1, 2, and 3 were incorporated, and the IP addresses and timestamps were replaced to blend the injected attack traces with normal ones. The detection accuracy of NetVigil remains consistent.

Figure 10:
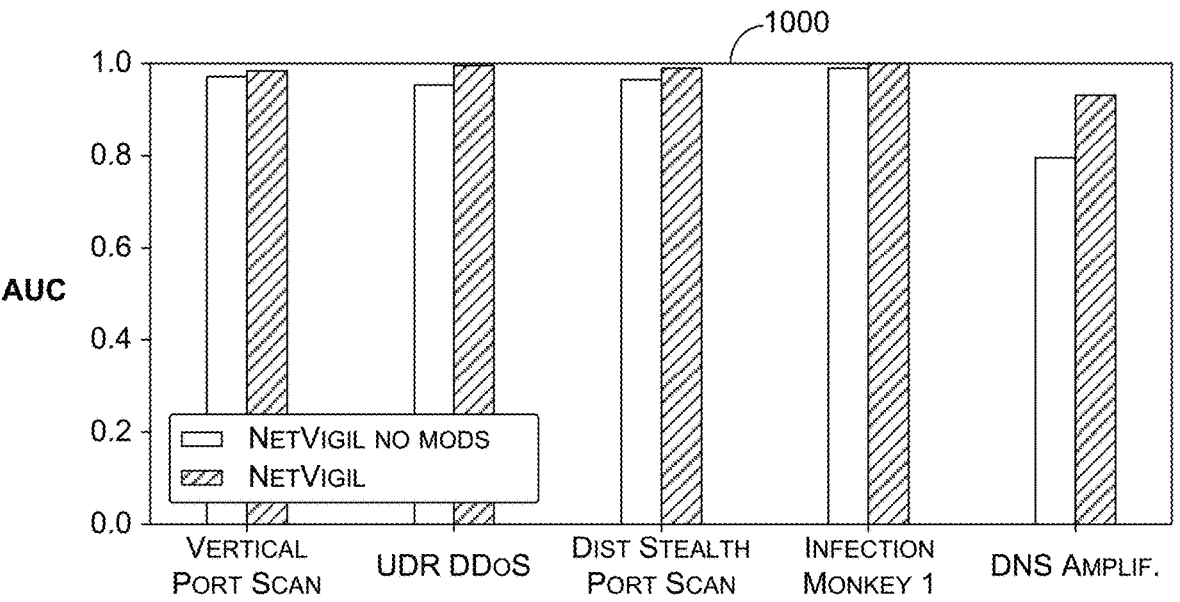

Experiments were also performed to determine the importance of temporal smoothing and data augmentation. FIG. 10 shows an AUC graph 1000 for NetVigil both with and without data augmentation and temporal smoothing. Using both techniques yields 1-2% AUC improvement for most baselines and 10% improvement for DNS (Domain Name System) amplification. Data augmentations add more heterogeneity to the dataset, allowing the dataset to become more robust to the dynamism in network traffic patterns. Temporal smoothing helps by ensuring that temporally similar graphs should be similar in structure and composition. Further, NetVigil no mods (without augmentation) still performs highly, yielding over 0.95 AUC for all but 1 attack trace, thus conveying the efficacy of the approach on new network patterns even without any modifications.

Figure 11:
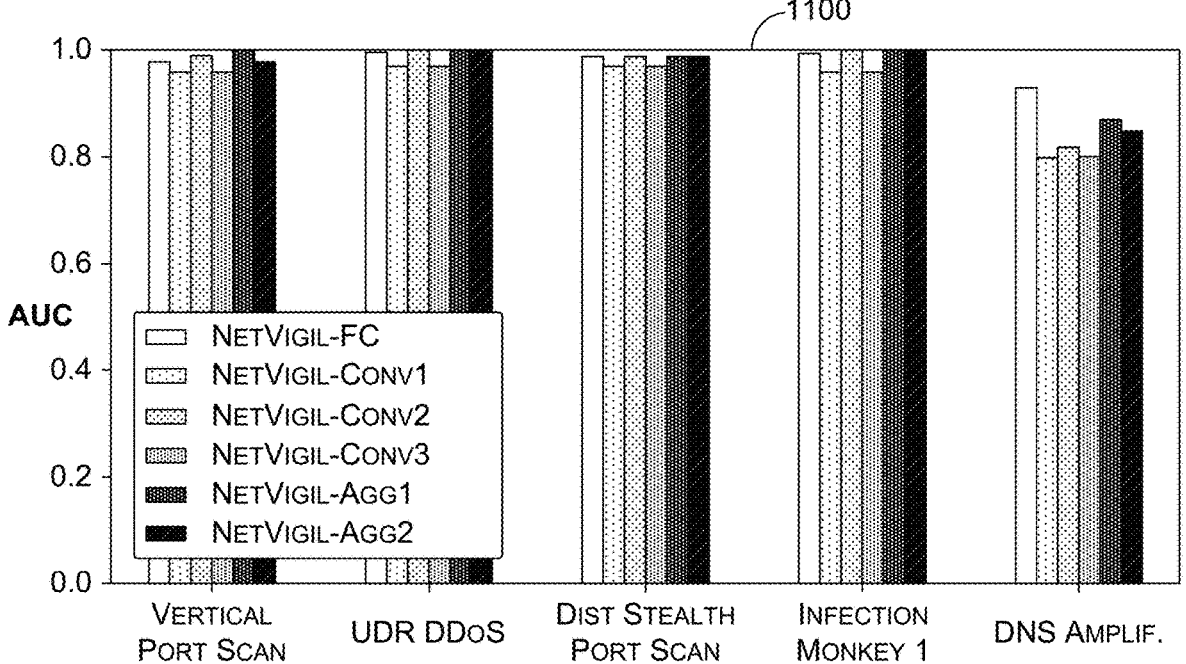

Further experiments were conducted with different architectural modifications. FIG. 11 shows an AUC results graph 1100 across 5 different attack traces with different model modifications. First, a simple GNN architecture with fully-connected layers that operate on the graph's node and edge features (denoted by NetVigil-FC) was employed. Three different graph convolutional architectures (denoted by Net-Vigil-Conv1, NetVigil-Conv2, NetVigil-Conv3) that use graph attention layers (Velickovic, et al., "*Graph attention networks,*" In International Conference on Learning Representations, 2018), GraphSAGE layers (Hamilton, et al., "*Inductive representation learning on large graphs,*" In I. Guyon, U. Von Luxburg, S. Bengio, H. Wallach, R. Fergus, S. Vishwanathan, and R. Garnett, editors, Advances in Neural Information Processing Systems, volume 30. Curran Associates, Inc., 2017), and EdgeConv layers (Wang, et al., "*Dynamic graph cnn for learning on point clouds,*" ACM Trans. Graph., 38 (5), October 2019) were also employed. Different aggregations for the message passing function using min( ) and max( ) instead of mean( ) were employed, denoted by NetVigil-Agg1 and NetVigil-Agg2, respectively. In summary, while NetVigil-FC performs the best overall due to its simpler architecture (and lower likelihood of overfitting) compared to the other architectures that use convolutional layers, all model variants perform similarly. Note that this approach is not tied to a particular model or architecture and that NetVigil is still able to reap significant performance gains on many different model variants.

Network flow logs may contain personally identifiable information (PII), such as user IP addresses, which are subject to data privacy compliance requirements. To address these privacy concerns, NetVigil employs two strategies. First, the model can be deployed using the Software as a Service (Saas) model, where users continuously stream anonymized network flow logs to a server. Anonymization can be achieved through encrypted IP addresses, as the model does not require plaintext IP addresses for anomaly detection, and users can interpret the encrypted results accordingly. Second, the model can be deployed within a user's cloud subscription as a standalone service, ensuring that all network flow logs remain entirely under the user's control. By implementing these strategies, a high level of privacy can be maintained while still providing effective anomaly detection in network traffic patterns.

NetVigil can employ at least one clean dataset to train the initial model, with subsequent models obtained as discussed previously. As with any anomaly-based intrusion detection systems, if a cloud deployment is already compromised from the outset, some anomalous behaviors might contaminate the model. Therefore, it can be safer to obtain the initial training set in a secure environment (e.g., a sandbox). This precautionary measure helps ensure that the model's foundation is built upon clean and reliable data, allowing it to effectively detect and adapt to genuine anomalies and fluctuations in network traffic patterns.

Example System

The present implementations can be performed in various scenarios on various devices. FIG. 12 shows one example system 1200 in which the present implementations can be employed, as discussed more below.

As shown in FIG. 12, system 1200 includes a client device 1210, a server 1220, a server 1230, and a client device 1240, connected by one or more network(s) 1250. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 12, but particularly the servers, can be implemented in data centers, server farms, etc. Network(s) 1250 can include, but are not limited to, network 100 and external network 104, discussed above with respect to FIG. 1.

Certain components of the devices shown in FIG. 12 may be referred to herein by parenthetical reference numbers. For the purposes of the following description, the parenthetical (1) indicates an occurrence of a given component on client device 1210, (2) indicates an occurrence of a given component on server 1220, (3) indicates an occurrence on server 1230, and (4) indicates an occurrence on client device 1240. Unless identifying a specific instance of a given component, this document will refer generally to the components without the parenthetical.

Generally, the devices 1210, 1220, 1230, and/or 1240 may have respective processing resources 1202 and storage resources 1204, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client devices 1210 and 1240 can include configuration module 1206(1) and configuration module 1206(4), respectively. Generally speaking, the configuration modules can be used to generate certain fields for configuring a machine learning model to detect network anomalies. Client devices 1210 and 1240 can also include output modules 1208(1) and 1208(4). Generally speaking, the output modules can display results produced by executing a trained machine learning model, e.g., results conveying anomalies detected for individual applications.

Server 1220 can host a hypervisor 1222, which can provide virtual machines for running application 1224, application 1226, and 1228. For example, server 1220 is one example of a cloud resource that can be implemented on a server rack in internal network 100 (FIG. 1). Each application can be a tenant within a data center.

Server 1230 can host a network flow collection module 1232, a model training model 1234, and a model execution model 1236. The network flow collection module can collect network flow logs from server 1220. The model training model 1234 can implement model training to obtain a model that can represent communication behavior of applications 1224, 1226, and 1228 using embeddings for each application edge. The model execution model 1236 can execute the trained model during inference processing to detect anomalies indicating that the current communication behavior of a given application has deviated significantly from previous behavior.

Example Model Training Method

Figure 13:
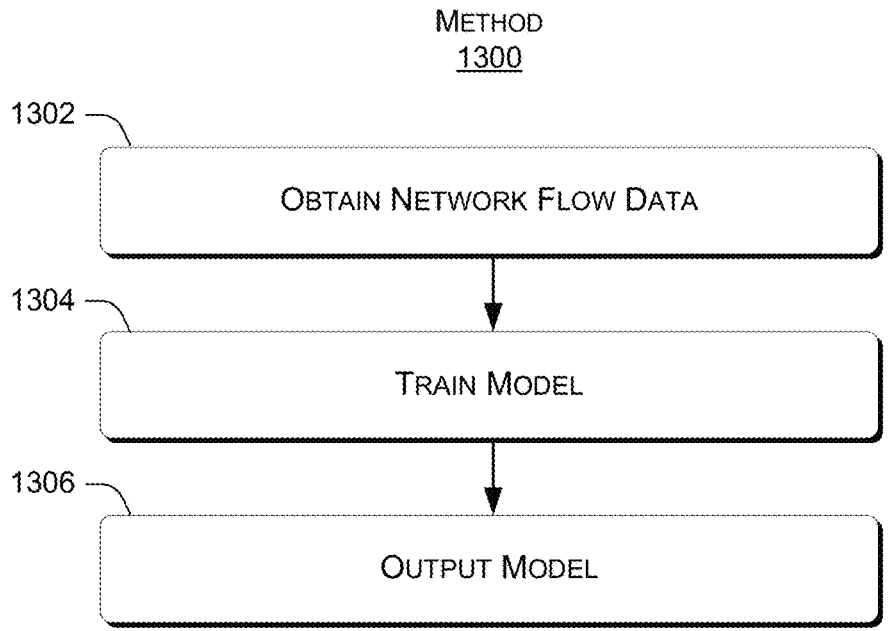
FIG. 13 illustrates an example method or technique for training a machine learning model to detect anomalies, consistent with some implementations of the present concepts.

FIG. 13 illustrates an example method 1300, consistent with the present concepts. Method 1300 can be implemented on many different types of devices, e.g., by one or more cloud servers, by a client device such as a laptop, tablet, or smartphone, or by combinations of one or more servers, client devices, etc. For instance, method 1300 can be performed by model training module 1234 on server 1230.

Method 1300 begins at block 1302, where network flow data for an application is obtained. For example, the network flow data can reflect aggregate statistics for network flow communications among application instances of an application. The application instances can be individual virtual machines or IP addresses that execute application code on a computing device, such as a server in a data center.

Method 1300 continues at block 1304, where a machine learning model is trained to represent network behavior of the application. For example, the machine learning model can be trained to learn weights that, when applied to features representing the aggregate statistics for any two communicating application instances, can be used to derive an embedding representing the network behavior of those communications. One suitable model that can be employed is a graph neural network.

Method 1300 continues at block 1306, where the trained model is output. For instance, the trained model can be output via shared memory, over a network, or to storage for subsequent inference processing and anomaly detection.

Example Inference Method

Figure 14:
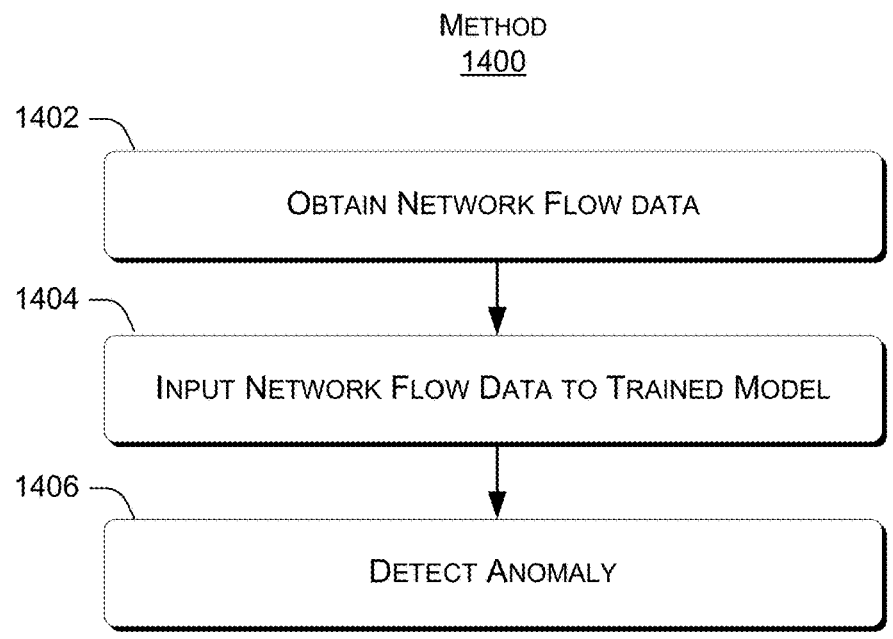
FIG. 14 illustrates an example method or technique for employing a trained machine learning model to detect an anomaly, consistent with some implementations of the present concepts.

FIG. 14 illustrates an example method 1400, consistent with the present concepts. Method 1400 can be implemented on many different types of devices, e.g., by one or more cloud servers, by a client device such as a laptop, tablet, or smartphone, or by combinations of one or more servers, client devices, etc. For instance, method 1400 can be performed by model training module 1236 on server 1230.

Method 1400 begins at block 1402, where network data flow data for an application is obtained. As noted previously, the network flow data can reflect aggregate statistics for recent network flow communications among application instances of an application. The application instances can be individual virtual machines or IP addresses that execute application code on a computing device, such as a server in a data center.

Method 1400 continues at block 1404, where the network flow data is input to a trained machine learning model. For instance, the machine learning model may have been previously trained to learn weights that, when applied to features representing the aggregate network communication statistics for any two communicating application instances, can be used to derive an embedding representing the network behavior of those communication. One suitable model that can be employed is a graph neural network.

Method 1400 continues at block 1406, where an anomaly is detected with the trained machine learning model. For instance, if the reconstruction loss for a given edge exceeds a threshold, then that edge can be considered to exhibit anomalous behavior and flagged for further processing, e.g., by a security team.

Example User Interfaces

The following discussion introduces some example graphical user interfaces or "GUIs" that can be employed consistently with the concepts described herein. FIG. 15 illustrates an example configuration GUI 1500. For instance, the configuration module 1206 on client device 1210 and/or 1240 might display configuration GUI 1500 to allow a user to input various values for configuring the use of a machine learning model for anomaly detection.

Configuration GUI 1500 includes an aggregation interval field 1502 that allows a user to specify an aggregation interval, e.g., 30 seconds. A feature set field 1504 allows the user to specify a set of network flow features to use for training, e.g., a local file designating features such as number of transmitted packets, number of received packets, total received/transmitted bytes, number of TCP/UDP flows, number of local/global unseen ports, total number of ports, etc. An application field 1506 allows the user to specify the application for which the model will be trained, e.g., "CustomerApp.exe." A contrastive loss field 1508 allows the user to enable/disable contrastive loss, and a temporal loss field 1510 allows the user to enable/disable temporal loss. A sensitivity field 1512 allows the user to configure the relative sensitivity of anomaly detection, e.g., a high sensitivity setting would identify an anomaly with relatively smaller differences between embeddings relative to a lower sensitivity setting.

Figure 16:
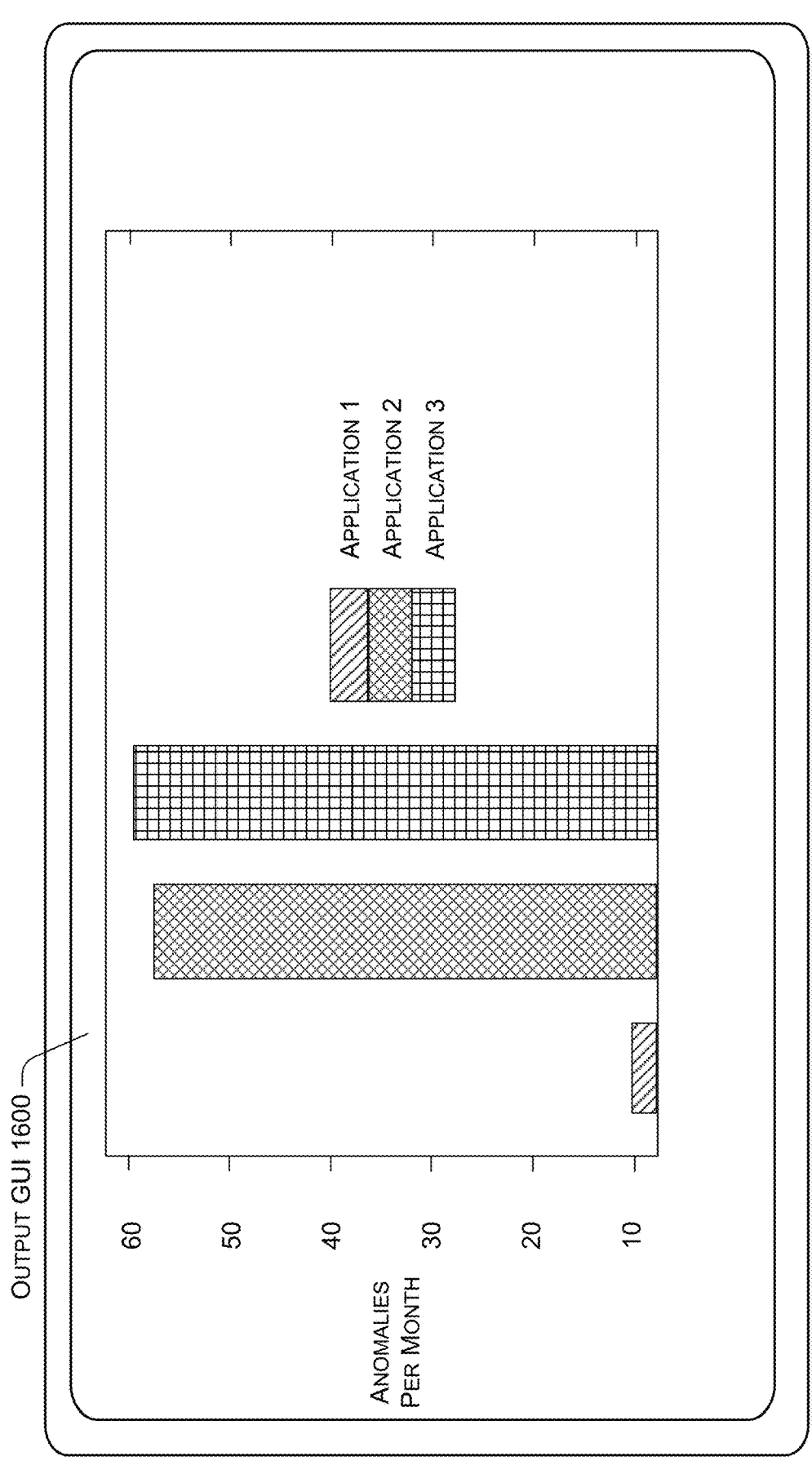

FIG. 16 illustrates an example output GUI 1600 that conveys the number of anomalies for each of three applications over the course of a given month. For instance, the output module 1208 on client device 1210 and/or 1240 might display output GUI 1600 to allow a user to see how frequently network anomalies are detected for different applications. Thus, output GUI 1600 can be used to determine when a particular application should be further investigated for security issues. If no issues are identified, the threshold for detecting anomalies could be increased so that fewer resources are expended tracking down false alarms.

Alternative Implementations

The above-described specific techniques employ graph neural networks as a specific example of a type of machine learning model that can be employed for anomaly detection. However, as also noted previously, other types of machine learning models can be employed. For instance, a fully-connected network with a binary classification layer or a support vector machine could also be employed. Note, however, that graph neural networks can conveniently encode contextual information for adjacent nodes and as a consequence can provide efficient, accurate, and robust anomaly detection.

Also, note that additional information beyond network flow data can also be employed to detect anomalies. For instance, application process names, memory or processor utilization, memory access patterns, use of heap or stack memory, etc. can also be employed as features for characterizing the behavior of an application. Note, however, that network flow data can be obtained without any modifications to hypervisor or application code, and even without additional information is sufficient for very accurate anomaly detection using the disclosed techniques.

Technical Effect

As discussed above, conventional approaches for detecting network attacks tend to have certain deficiencies. Signature-based techniques work only for known attacks and are not suitable for detecting new or "zero-day" attacks. Packet traces can be analyzed to detect anomalous behavior and identify new attacks, but packet traces cannot feasibly be analyzed for internal communications in large-scale networks, such as data center networks, due to the massive amount of data that would be involved.

The disclosed techniques can accurately detect new network attacks using a very efficient anomaly detection approach. Network flow data provides a much more compact representation of application network behavior than a detailed packet trace. However, as demonstrated above, aggregate statistics from network flow data nevertheless provide sufficient information to accurately detect anomalous communications between any pair of application instances.

As a consequence, network anomalies can be detected using far fewer resources than would be the case with packet traces. Because network flow data is so compact relative to packet traces, the disclosed techniques can detect anomalies with far fewer processor cycles and much smaller memory and storage footprints (e.g., fewer bytes of memory/storage). In addition, as demonstrated above, the disclosed techniques allow for low-latency detection of anomalies, thus mitigating potential damage by early identification of anomalous behavior.

Furthermore, continuous retraining of the model allows the disclosed techniques to adjust as typical application behavior changes over time. Anomalies are detected when application behavior changes rapidly, but when application behavior changes gradually over time, this is reflected in the updates to the model, thus reducing false positives. Temporal smoothing techniques ensure encourage the model to represent adjacent application edges using similar embeddings, which also contributes to lower false alarm rates. Contrastive learning ensures that the model is sufficiently general so as to not generate false alarms for normal minor deviations in application behavior.

Device Implementations

As noted above with respect to FIG. 12, system 1200 includes several devices, including a client device 1210, a server 1220, a server 1230, and a client device 1240. As also noted, not all device implementations can be illustrated and other device implementations should be apparent to the skilled artisan from the description above and below.

The term "device," "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., compact discs, digital versatile discs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), GPUs, controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, red-green-blue camera systems or using accelerometers/gyroscopes, facial recognition, etc.). Devices can also have various output mechanisms such as printers, monitors, etc. In further implementations, Internet of Things (IoT) devices can be used in place of or in addition to other types of computing devices discussed herein.

Also note that the devices described herein can function in a stand-alone or cooperative manner to implement the described techniques. For example, the methods and functionality described herein can be performed on a single computing device and/or distributed across multiple computing devices that communicate over network(s) 1250. Without limitation, network(s) 1250 can include one or more local area networks (LANs), wide area networks (WANs), the Internet, and the like.

Various examples are described above. Additional examples are described below. One example includes a method comprising obtaining network flow data reflecting aggregate statistics for network communications among a plurality of application instances of an application, based at least on the network flow data, training a machine learning model to represent network behavior of the application, and outputting the trained machine learning model.

Another example can include any of the above and/or below examples where the application executing within a data center.

Another example can include any of the above and/or below examples where the network communications comprising internal communications by the application within the data center.

Another example can include any of the above and/or below examples where the machine learning model comprising a graph neural network configured to process graphs representing the network behavior of the application, each graph having nodes representing respective application instances and edges representing communication between the respective application instances.

Another example can include any of the above and/or below examples where each application instance comprises an Internet Protocol address or a virtual machine.

Another example can include any of the above and/or below examples where the training comprises determining weights of the graph neural network based at least on the network behavior of the application.

Another example can include any of the above and/or below examples where the training comprises representing individual edges of each graph as corresponding embeddings.

Another example can include any of the above and/or below examples where the training comprises determining the weights based at least on a reconstruction loss reflecting a difference between actual network flow data for a particular edge and reconstructed network flow data derived from a particular embedding for the particular edge.

Another example can include any of the above and/or below examples where the training comprises determining the weights based at least on a temporal loss that encourages similarity of embeddings between temporally-adjacent graphs.

Another example can include any of the above and/or below examples where the training comprises determining the weights based at least on a contrastive loss determined using an augmentation strategy.

Another example can include any of the above and/or below examples where the augmentation strategy comprising random edge and node removal.

Another example can include any of the above and/or below examples where the augmentation strategy comprising adding noise to edge features.

Another example can include any of the above and/or below examples where the augmentation strategy comprising removing non-application edges from one or more of the graphs.

Another example can include a system comprising a hardware processing unit, and a storage resource storing computer-readable instructions which, when executed by the hardware processing unit, cause the hardware processing unit to obtain network flow data for an application, input network flow data to a trained machine learning model, and detect a network anomaly based at least on an output of the trained machine learning model.

Another example can include any of the above and/or below examples where the output represents network behavior of the application.

Another example can include any of the above and/or below examples where the output includes edge embeddings reflecting communications between application instances of the application.

Another example can include any of the above and/or below examples where the computer-readable instructions, when executed by the hardware processing unit, cause the hardware processing unit to decode the edge embeddings to obtain reconstructed network flow data for respective edges of the application, calculate a reconstruction loss based at least on the reconstructed network flow data and the network flow data that was obtained, and detect the network anomaly based at least on the reconstruction loss.

Another example can include any of the above and/or below examples where the computer-readable instructions, when executed by the hardware processing unit, cause the hardware processing unit to detect the network anomaly when the reconstruction loss for a particular edge exceeds a threshold.

Another example can include any of the above and/or below examples where the computer-readable instructions, when executed by the hardware processing unit, cause the hardware processing unit to remove the anomaly from the network flow data to obtain clean network flow data, and retrain the machine learning model based at least on the clean network flow data.

Another example can include a computer-readable storage medium storing instructions which, when executed by a processing device, cause the processing device to perform acts comprising obtaining network flow data for an application, inputting the network flow data to a trained machine learning model, and detecting a network anomaly based at least on an output of the trained machine learning model.

The invention claimed is:

1. A method comprising:

identifying a subset of cloud resources within a data center that execute application instances associated with a particular application;

determining respective network addresses of the application instances;

based at least on respective network addresses of the application instances, obtaining network flow data reflecting aggregate statistics for network communications among the application instances;

generating graphs based at least on the network flow data, the graphs having nodes representing the application instances and edges representing respective network flow data for pairs of nodes connected by the edges;

based at least on the graphs, training a machine learning model to represent individual edges of each graph as corresponding embeddings; and outputting the trained machine learning model.

2. The method of claim 1, wherein the outputting comprises:

outputting the trained machine learning model over a network, to shared memory, or to storage, wherein the outputting renders the trained machine learning model available for subsequent inference processing and anomaly detection.

3. The method of claim 2, the network communications comprising internal communications by the application within the data center.

4. The method of claim 1, the machine learning model comprising a graph neural network.

5. The method of claim 4, wherein each application instance corresponds to a different Internet Protocol address or a different virtual machine.

6. The method of claim 4, wherein the training comprises determining weights of the graph neural network based at least on the graphs.

7. The method of claim 6, wherein the training comprises determining the weights of the graph neural network based at least on a reconstruction loss reflecting a difference between actual network flow data for a particular edge and reconstructed network flow data derived from a particular embedding for the particular edge.

8. The method of claim 7, wherein the training comprises determining the weights of the graph neural network based at least on a temporal loss that encourages similarity of embeddings between temporally-adjacent graphs.

9. The method of claim 8, wherein the training comprises determining the weights of the graph neural network based at least on a contrastive loss determined using an augmentation strategy.

10. The method of claim 9, the augmentation strategy comprising random edge and node removal.

11. The method of claim 9, the augmentation strategy comprising adding noise to edge features.

12. The method of claim 9, the augmentation strategy comprising removing non-application edges from one or more of the graphs.

13. A system comprising:
   a hardware processing unit; and
   a storage resource storing computer-readable instructions which, when executed by the hardware processing unit, cause the hardware processing unit to:
      identify a subset of cloud resources within a data center that execute application instances associated with a particular application;
      determine respective network addresses of the application instances;
      based at least on respective network addresses of the application instances, obtain network flow data reflecting aggregate statistics for network communications among the application instances;
      generate graphs based at least on the network flow data, the graphs having nodes representing the application instances and edges representing respective network flow data for pairs of nodes connected by the edges;
      based at least on the graphs, train a machine learning model to represent individual edges of each graph as corresponding embeddings; and
      output the trained machine learning model.

14. The system of claim 13, wherein the aggregate statistics employed to train the machine learning model include at least one of:
   for each pair of application instances that communicate with one another:
      a number of packets transmitted or received over a period of time, a number of bytes transmitted or received over the period of time,
      a number of ports used over the period of time,
      a number of transmission control protocol flows used over the period of time, or
      a number of user datagram protocol flows used over the period of time.

15. The system of claim 13, wherein the machine learning model is a graph neural network, and the aggregate statistics employed to train the graph neural network include:
   for each pair of application instances that communicate with one another:
      a number of packets transmitted or received over a period of time,
      a number of bytes transmitted or received over the period of time,
      a number of ports used over the period of time,
      a number of transmission control protocol flows used over the period of time, and
      a number of user datagram protocol flows used over the period of time.

16. The system of claim 13, wherein the embeddings, when decoded, characterize the network flow data along the edges of the graphs.

17. The system of claim 16, wherein the computer-readable instructions, when executed by the hardware processing unit, cause the hardware processing unit to:
   during training, learn weights that are applied to the network flow data to determine the embeddings.

18. The system of claim 17, wherein the computer-readable instructions, when executed by the hardware processing unit, cause the hardware processing unit to:
   learn the weights based at least on reconstruction loss calculated using the embeddings.

19. A computer-readable storage medium storing instructions which, when executed by a processing device, cause the processing device to perform acts comprising:
   identifying a subset of cloud resources within a data center that execute application instances associated with a particular application;
   determining respective network addresses of the application instances;
   based at least on respective network addresses of the application instances, obtaining network flow data reflecting aggregate statistics for network communications among the application instances;
   generating graphs based at least on the network flow data, the graphs having nodes representing the application instances and edges representing respective network flow data for pairs of nodes connected by the edges;
   based at least on the graphs, training a machine learning model to represent individual edges of each graph as corresponding embeddings; and
   outputting the trained machine learning model.

* * * * *